United States Patent
Igarashi

(10) Patent No.: US 8,718,870 B2
(45) Date of Patent: May 6, 2014

(54) VEHICLE CONTROL SYSTEM AND CONTROL DEVICE

(75) Inventor: Masashi Igarashi, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/820,058

(22) PCT Filed: Sep. 3, 2010

(86) PCT No.: PCT/JP2010/065183
§ 371 (c)(1),
(2), (4) Date: Feb. 28, 2013

(87) PCT Pub. No.: WO2012/029185
PCT Pub. Date: Mar. 8, 2012

(65) Prior Publication Data
US 2013/0158798 A1    Jun. 20, 2013

(51) Int. Cl.
*G05D 1/08*    (2006.01)
*G06F 17/00*    (2006.01)
*G01M 17/02*    (2006.01)

(52) U.S. Cl.
USPC ............... 701/36; 701/10; 73/146; 180/197

(58) Field of Classification Search
None
See application file for complete search history.

(56) References Cited

U.S. PATENT DOCUMENTS

| | | | |
|---|---|---|---|
| 2002/0095253 A1* | 7/2002 | Losey et al. | 701/71 |
| 2002/0095980 A1* | 7/2002 | Breed et al. | 73/146 |
| 2005/0080546 A1* | 4/2005 | Milot | 701/70 |
| 2005/0096830 A1* | 5/2005 | Ohta et al. | 701/91 |
| 2005/0235744 A1* | 10/2005 | Ogawa | 73/146 |
| 2007/0289795 A1* | 12/2007 | Fandard et al. | 180/197 |
| 2009/0243237 A1* | 10/2009 | Sasaki | 280/5.524 |

FOREIGN PATENT DOCUMENTS

| | | |
|---|---|---|
| JP | 04-031605 U | 3/1992 |
| JP | 07-290916 A | 11/1995 |
| JP | 2002-317679 A | 10/2002 |
| JP | 2003-220962 A | 8/2003 |
| JP | 2005-212791 A | 8/2005 |
| JP | 2006-117144 A | 5/2006 |
| JP | 2006-142895 A | 6/2006 |
| JP | 2008-514498 A | 5/2008 |
| JP | 2008-155889 A | 7/2008 |

* cited by examiner

*Primary Examiner* — Behrang Badii
*Assistant Examiner* — Demetra Smith-Stewart
(74) *Attorney, Agent, or Firm* — Kenyon & Kenyon LLP

(57) ABSTRACT

A vehicle control system includes an actuator capable of adjusting a behavior of a vehicle, a temperature detecting device configured to detect a temperature of a tire on a wheel of the vehicle, and a control device configured to control the actuator according to the temperature of the tire detected by the temperature detecting device so as to change a degree of suppressing a behavior change of the vehicle by the actuator. Therefore, the vehicle control system can suppress a variation in a driving feeling.

20 Claims, 16 Drawing Sheets

VEHICLE CONTROL SYSTEM AND CONTROL DEVICE

This is a 371 national phase application of PCT/JP2010/065183 filed 3 Sep. 2010, the entire content of which is incorporated herein by reference.

FIELD

The present invention relates to a vehicle control system and a control device.

BACKGROUND

As a conventional vehicle control system or a control device, Patent Literature 1 describes a vehicle motion control device that estimates a temperature and an amount of deformation of a tire by using a camera mounted to a vehicle body, determines a turning state of the vehicle, e.g., determines whether understeer or oversteer occurs or not, based upon the obtained temperature and the amount of deformation of the tire, and decides a control amount of a steering angle.

CITATION LIST

Patent Literature

Patent Literature 1: Japanese Patent Application Laid-open No. 2006-142895

SUMMARY

Technical Problem

The vehicle motion control device described in Patent Literature 1 has a room for improvement to suppress variation in driving feeling, for example.

The present invention is accomplished in view of the above-mentioned circumstance, and aims to provide a vehicle control system and a control device that can suppress variation in driving feeling.

Solution to Problem

In order to achieve the above mentioned object, a vehicle control system according to the present invention includes an actuator capable of adjusting a behavior of a vehicle; a temperature detecting device configured to detect a temperature of a tire on a wheel of the vehicle; and a control device configured to control the actuator according to the temperature of the tire detected by the temperature detecting device so as to change a degree of suppressing a behavior change of the vehicle by the actuator.

Further, in the vehicle control system, it is possible to configure that the control device increases the degree of suppressing the behavior change of the vehicle by the actuator, when the temperature of the tire detected by the temperature detecting device is relatively high, compared to a case where the temperature of the tire is relatively low.

Further, in the vehicle control system, it is possible to configure that the control device decreases the degree of suppressing the behavior change of the vehicle by the actuator, when the temperature of the tire detected by the temperature detecting device is relatively low, compared to a case where the temperature of the tire is relatively high.

Further, in the vehicle control system, it is possible to configure that the control device increases the degree of suppressing the behavior change of the vehicle by the actuator, as the temperature of the tire detected by the temperature detecting device is high, and decreases the degree of suppressing the behavior change of the vehicle by the actuator, as the temperature of the tire detected by the temperature detecting device is low.

Further, in the vehicle control system, it is possible to configure that the temperature detecting device detects a temperature in a tread of the tire.

Further, in the vehicle control system, it is possible to configure that the actuator can change the degree of suppressing the behavior change of the vehicle by changing a steering characteristic of the vehicle.

Further, in the vehicle control system, it is possible to configure that the actuator can change the degree of suppressing the behavior change of the vehicle by changing a suspension characteristic of the vehicle.

Further, in the vehicle control system, it is possible to configure that the actuator can steer the wheel according to a steering torque inputted to a steering member, and the control device controls the actuator so as to decrease a turning amount of the wheel to the steering torque inputted to the steering member, when the temperature of the tire detected by the temperature detecting device is relatively high, compared to the case in which the temperature of the tire is relatively low.

Further, in the vehicle control system, it is possible to configure that the actuator can change a slip angle balance between a slip angle of a front wheel and a slip angle of a rear wheel of the vehicle, and the control device controls the actuator so as to adjust the slip angle balance, and increases the degree of suppressing the behavior change of the vehicle by the actuator, when the temperature of the tire detected by the temperature detecting device is relatively high, compared to the case in which the temperature of the tire is relatively low.

Further, in the vehicle control system, it is possible to configure that the actuator can change the slip angle of the rear wheel of the vehicle, and the control device controls the actuator so as to increase the slip angle of the rear wheel of the vehicle, when the temperature of the tire detected by the temperature detecting device is relatively high, compared to the case in which the temperature of the tire is relatively low.

Further, in the vehicle control system, it is possible to configure that the control device controls the actuator so as to change the degree of suppressing the behavior change of the vehicle based on cornering power or self-aligning power of the wheel that reduces with the increase in the temperature of the tire.

Further, in the vehicle control system, it is possible to further include an adjusting device capable of adjusting the temperature of the tire, and it is possible to configure that the control device controls the adjusting device so as to adjust the temperature of the tire to be a temperature equal to or higher than a predetermined temperature set in advance.

In order to achieve the above mentioned object, a vehicle control system according to the present invention includes an adjusting device capable of adjusting a temperature of a tire on a wheel of a vehicle; and a control device configured to control the adjusting device so as to adjust the temperature of the tire to be a temperature equal to or higher than a predetermined temperature set in advance.

In order to achieve the above mentioned object, a control device according to the present invention that controls an actuator, which can adjust a behavior of a vehicle, according to a temperature of a tire detected by a temperature detecting device that detects the temperature of the tire on a wheel of the vehicle, in order to change a degree of suppressing a behavior change of the vehicle by the actuator.

In order to achieve the above mentioned object, a control device according to the present invention that controls an adjusting device that can adjust a temperature of a tire on a wheel of a vehicle, in order to adjust the temperature of the tire to be a temperature equal to or higher than a predetermined temperature set in advance.

Advantageous Effects of Invention

The vehicle control system and the control device according to the present invention provides an effect of suppressing the variation in driving feeling.

DESCRIPTION OF EMBODIMENTS

Embodiments of the present invention will be described below in detail with reference to the drawings. The present invention is not limited by these embodiments. The components in the embodiments described below include those that can be replaced or easily made by a person skilled in the art, and those substantially equivalent.

First Embodiment

Figure 1:
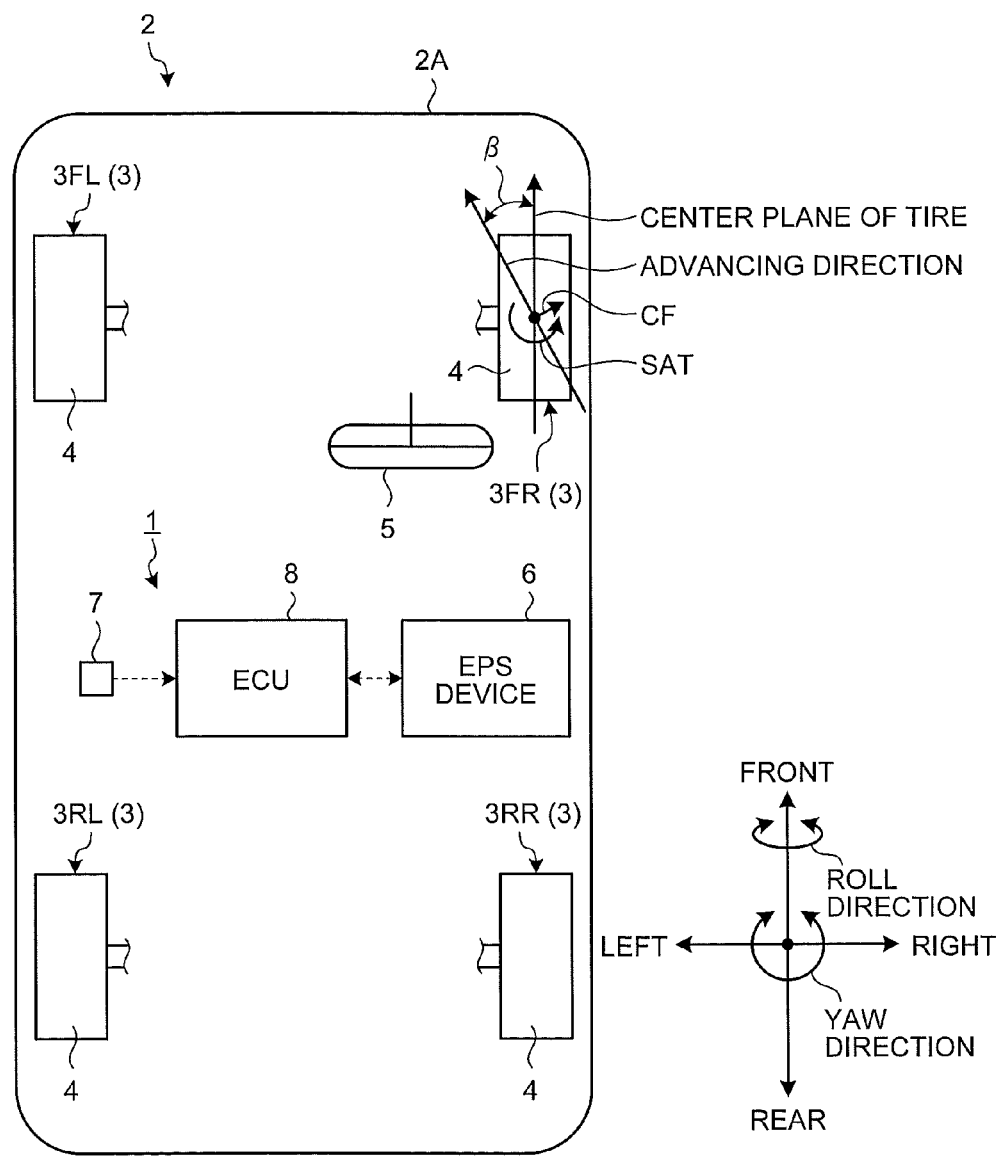
FIG. 1 is a schematic diagram illustrating a schematic configuration of a vehicle control system according to a first embodiment.
Figure 2:
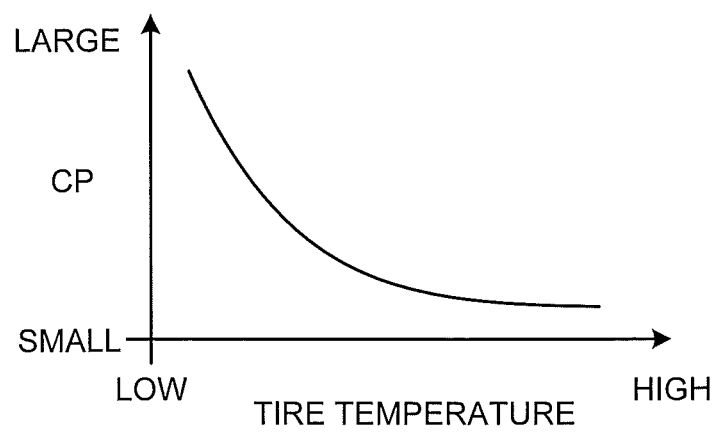
FIG. 2 is a diagram explaining a relationship between a temperature of a tire and cornering power.
Figure 3:
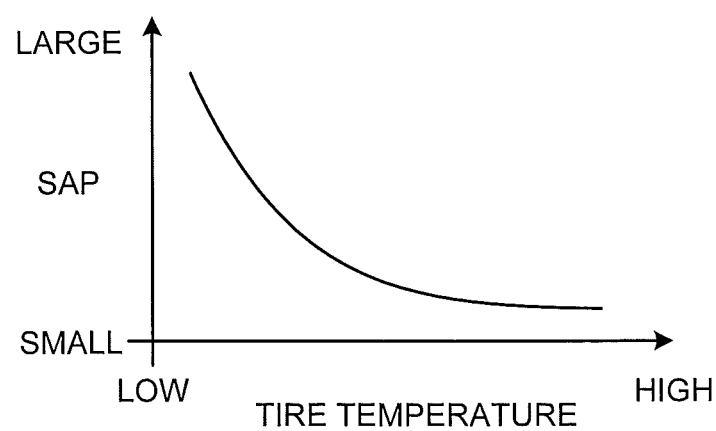
FIG. 3 is a diagram explaining a relationship between a temperature of a tire and self-aligning power.
Figure 4:
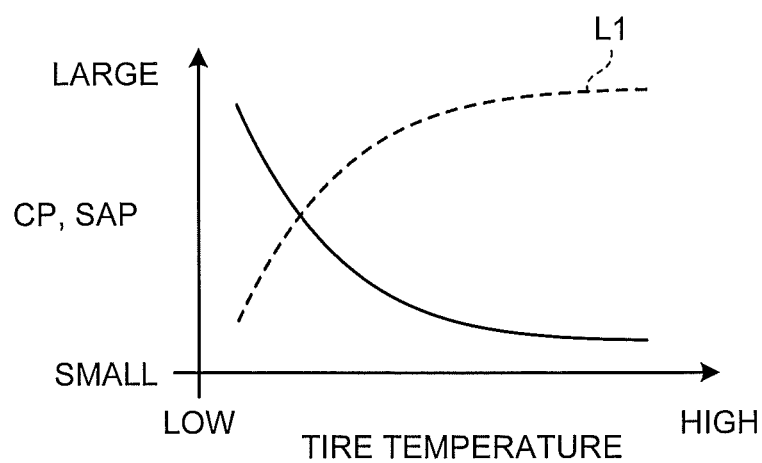
FIG. 4 is a diagram explaining one example of a relationship between a tire characteristic and a degree of suppressing a behavior change.
Figure 5:
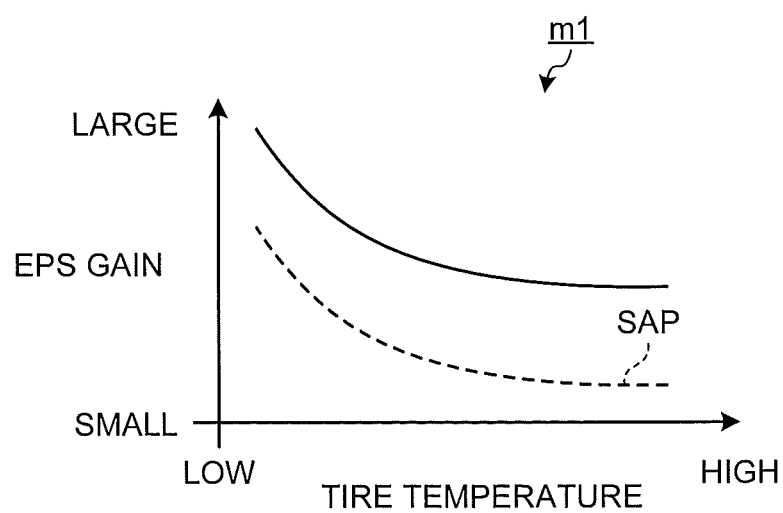
FIG. 5 is a diagram illustrating one example of an EPS gain map.
Figure 6:
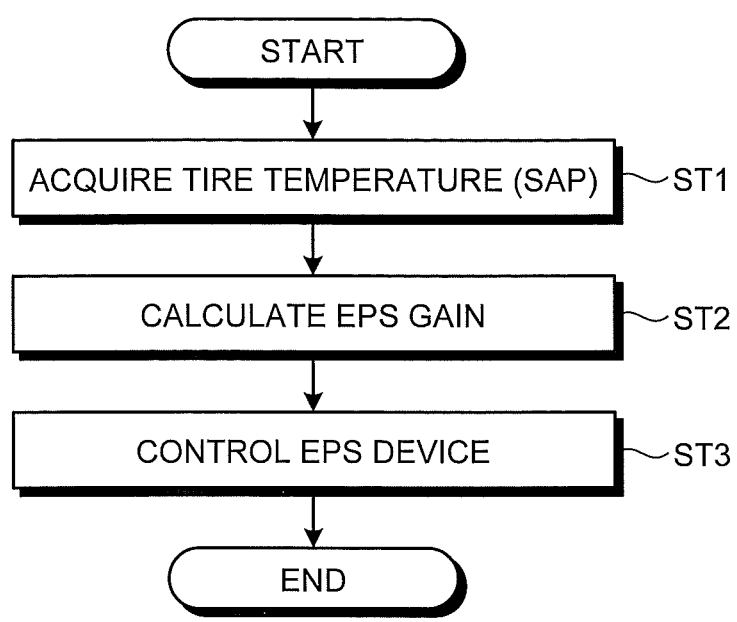
FIG. 6 is a flowchart illustrating one example of EPS control.

FIG. 1 is a schematic diagram illustrating a schematic configuration of a vehicle control system according to a first embodiment, FIG. 2 is a diagram explaining a relationship between a temperature of a tire and cornering power, FIG. 3 is a diagram explaining a relationship between a temperature of a tire and self-aligning power, FIG. 4 is a diagram explaining one example of a relationship between a tire characteristic and a degree of suppressing a behavior change, FIG. 5 is a diagram illustrating one example of an EPS gain map, and FIG. 6 is a flowchart illustrating one example of EPS control.

A vehicle control system 1 according to the present embodiment is mounted to a vehicle 2 for controlling the vehicle 2 as illustrated in FIG. 1, and it is a vehicle behavior control device for controlling the behavior of the vehicle 2. The vehicle control system 1 typically varies the characteristic of the vehicle 2 based upon a temperature of a tire 4 on a wheel 3, thereby suppressing variation in the driving feeling involved with the change in the temperature of the tire 4, and preventing a drive's feeling of strangeness during the driving.

The vehicle 2 includes a front-left wheel 3FL, a front-right wheel 3FR, a rear-left wheel 3RL, and a rear-right wheel 3RR as the wheels 3. When it is unnecessary to distinguish these wheels, they are merely referred to as the wheel 3. Power generated from a drive source (prime mover), e.g., an internal combustion engine or electric motor, is applied to the wheel 3 (e.g., a front-left wheel 3FL, and a front-right wheel 3FR), so that the vehicle 2 generates drive force [N] on a contact surface between the wheel 3 and a road surface, and hence, the vehicle 2 can run. When a driver operates to rotate a steering wheel 5 serving as a steering member (steering operation), the wheel 3 (e.g., the front-left wheel 3FL and the front-right wheel 3FR) serving as a steered wheel can be steered, whereby the vehicle 2 can turn.

The longitudinal direction of the vehicle 2 described below is the direction along the traveling direction of the vehicle 2, and the lateral direction of the vehicle 2 is the widthwise direction of the vehicle 2 perpendicular to the longitudinal direction and the vertical direction. A roll direction is a direction around a longitudinal axis that is an axis along the longitudinal direction of the vehicle, and a yaw direction is a direction around a vertical axis along the vertical direction of the vehicle.

A tire characteristic including cornering power (hereinafter referred to as "CP", unless otherwise specified) or self-aligning power (hereinafter referred to as "SAP", unless otherwise specified) of the tire 4 mounted to the wheel 3 tends to have relatively high temperature dependency. Therefore, the tire characteristic of the tire 4, such as CP or SAP, varies according to the temperature of the tire 4, even in the same tire 4.

The CP of the tire 4 corresponds to cornering force CF per a unit slip angle (sideslip angle) β illustrated in FIG. 1. The slip angle β is an angle made by the advancing direction of the tire 4 and the center plane of the tire. The cornering force CF is component force applied to the direction perpendicular to the advancing direction of the tire during the cornering (turn) of the vehicle 2. The SAP of the tire 4 corresponds to self-aligning torque SAT per the unit slip angle β illustrated in FIG. 1. The self-aligning torque SAT is a moment around the contact point of the tire 4 (around a vertical axis), and corresponds to restoring force for returning the steering wheel 5 to the straight position. When the tire 4 rolls with the predetermined slip angle β, a point of load of the cornering force CF is shifted from the center of the contact point of the tire 4. Therefore, force (torque) is exerted in the direction of reducing the slip angle β around the center of the contact point. This force corresponds to the self-aligning force SAT. The self-aligning torque SAT affects straight line stability and heaviness of the steering wheel 5.

In FIG. 2, an abscissa axis indicates a tire temperature, and an ordinate axis indicates CP of the tire 4. In FIG. 3, an abscissa axis indicates a tire temperature, and an ordinate axis indicates SAP of the tire 4. As illustrated in FIG. 2, if the vertical load is equal, a tread rubber of the tire 4 becomes soft to be easily deformed, as the tire temperature becomes higher. Therefore, there is a tendency that the higher the tire temperature becomes, the smaller the CP of the tire 4 becomes, and the lower the tire temperature becomes, the larger the CP of the tire 4 becomes. Similarly, if the vertical load is equal, there is a tendency that the higher the tire temperature becomes, the smaller the SAP of the tire 4 becomes, and the lower the tire temperature becomes, the larger the SAP of the tire 4 becomes.

As a result, when the CP or SAP varies due to the change in the temperature of the tire 4, the vehicle 2 might cause a variation in a driving feeling of a driver driving the vehicle 2, for example. Specifically, the vehicle 2 might provide a different driving feeling to the driver between a period of starting the drive when the tire 4 is cold, and a period of a predetermined time elapsed from the start of the drive when the tire 4 is warm. Typically, the motion of the vehicle 2 tends to be large with respect to an operation input or disturbance input, having an equivalent amount, i.e., the behavior of the vehicle 2 tends to be easily changed, as the CP and SAP reduces because of the increased temperature of the tire 4.

In view of this, the vehicle control system 1 of the present embodiment changes the characteristic of the vehicle 2 to suppress more the behavior change of the vehicle 2 to the equivalent input, as the temperature of the tire 4 relatively increases. In other words, the vehicle control system 1 changes the characteristic of the vehicle 2 to allow more the behavior change of the vehicle 2 to the equivalent input, as the temperature of the tire 4 relatively decreases. Specifically, as illustrated in FIG. 4, the vehicle control system 1 increases a degree L1 of suppressing the behavior change of the vehicle 2 with the increase in the tire temperature, in order to compensate the deterioration in the tire characteristic (CP, SAP, etc.) caused by the increased tire temperature by the change in the characteristic of the vehicle. In other words, in the vehicle control system 1, a later-described ECU 8 increases the degree of suppressing the behavior change of the vehicle 2 by a later-described actuator, as the temperature of the tire detected by a later-described temperature sensor 7 is high, and decreases the degree of suppressing the behavior change of the vehicle 2 by the actuator, as the temperature of the tire detected by the temperature sensor 7 is low. By virtue of this process, the vehicle control system 1 prevents the generation of difference between a driving feeling during the driving with the tire 4 having low temperature, and a driving feeling during the driving with the tire 4 having high temperature, thereby suppressing the variation in the driving feeling.

In the present embodiment, the vehicle control system 1 includes an electronic power steering (EPS) device (hereinafter referred to as "EPS device", unless otherwise specified) 6 serving as the actuator as illustrated in FIG. 1. The ECU 8 serving as the control device controls the EPS device 6 according to the temperature of the tire 4, whereby the vehicle control system 1 suppresses the variation in the driving feeling.

Specifically, the vehicle control system 1 includes the EPS device 6, the temperature sensor 7 serving as a temperature detecting device, and the ECU 8 serving as the control device.

The EPS device 6 can steer the wheel 3, which is the steered wheel, in a predetermined turning amount according to the steering torque, which is steering force, inputted to the steering wheel 5 serving as the steering member from a driver. The EPS device 6 assists the driver's operation of the steering wheel 5 by power such as the electric motor. The EPS device 6 outputs assist torque that is steering assist force for assisting the steering torque inputted to the steering wheel 5 by the driver, and steers the steered wheel (that is mechanically coupled to the steering wheel 5) by the steering torque and the assist torque. The EPS device 6 applies the assist torque to a rotation shaft of the steering wheel 5 to assist the driver's steering operation, for example. The EPS device 6 is connected to the ECU 8, and controlled by the ECU 8.

In other words, the EPS device 6 can adjust the behavior of the vehicle 2, and in the present embodiment, it can change the degree of suppressing the behavior change of the vehicle 2. The EPS device 6 changes the steering characteristic of the vehicle 2, thereby being capable of changing the degree of the behavior change of the vehicle 2, i.e., the degree of suppressing the behavior change of the vehicle 2. The EPS device 6 adjusts the degree of the assist to the steering torque applied to the steering wheel 5 by the driver, thereby being capable of adjusting the turning amount of the steered wheel to the steering torque inputted to the steering wheel 5, e.g., the amount of change of the turning angle of the steered wheel. By utilizing this, the degree of suppressing the behavior change of the vehicle 2 can be adjusted.

For example, the EPS device 6 relatively decreases the assist torque (assist amount) when the equivalent steering torque is applied to the steering wheel 5 by the driver, thereby being capable of relatively decreasing the turning amount of the wheel 3 to the equivalent steering torque. With this process, the EPS device 6 can relatively reduce the behavior change of the vehicle 2 to the equivalent steering torque. In other words, the EPS device 6 relatively decreases the assist torque, thereby being capable of increasing the degree of suppressing the behavior change of the vehicle 2 to the equivalent steering input. On the other hand, the EPS device 6 relatively increases the assist torque (assist amount) when the equivalent steering torque is applied to the steering wheel 5 by the driver, thereby being capable of relatively increasing the turning amount of the wheel 3 to the equivalent steering torque. With this process, the EPS device 6 can relatively increase the behavior change of the vehicle 2 to the equivalent steering torque. In other words, the EPS device 6 relatively increases the assist torque, thereby being capable of decreasing the degree of suppressing the behavior change of the vehicle 2 to the equivalent steering input.

The temperature sensor 7 detects the temperature of the tire 4 on the wheel 3 of the vehicle 2, and a thermocouple or thermistor can be used for the temperature sensor 7. More specifically, the temperature sensor 7 detects the temperature in the tread of the tire 4, e.g., the temperature of a carcass layer, a belt layer, or a tread rubber, which are the components in the tread. Preferably, the temperature sensor 7 detects the temperature in the tread rubber between the tread surface of the tire 4 and the top surface of the belt layer. In the present embodiment, only one temperature sensor 7 is illustrated. However, the temperature sensor 7 may be provided for each of four wheels 3. The temperature sensor 7 is electrically connected to the ECU 8, and transmits a signal of the detected temperature of the tire 4 to the ECU 8. A contactless temperature sensor utilizing infrared ray can be used as the temperature sensor 7. The temperature sensor 7 may detect the temperature of a wheel to which the tire is mounted, and detect and estimate the temperature in the tread of the tire 4 based upon the detected temperature, for example.

The ECU 8 controls the drive of each unit of the vehicle 2. The ECU 8 is an electric circuit mainly composed of known microcomputer including a CPU, ROM, RAM, and interface. Various sensors, such as the above-mentioned temperature sensor, mounted to each unit of the vehicle 2, and detecting devices are electrically connected to the ECU 8, and each unit of the vehicle 2 such as the EPS device 6 is electrically connected to the ECU 8. The ECU 8 receives electric signals corresponding to detection results detected by the various sensors and detecting devices, outputs a drive signal to each unit of the vehicle 2 according to the inputted detection results, and controls the drive of the respective units.

As basic control, the ECU 8 controls the EPS device 6 to adjust the assist torque based upon the steering torque to the steering wheel 5 detected by the torque sensor included in the EPS device 6. In the vehicle 2, the wheel 3 serving as the steered wheel is steered with a predetermined turning amount by axial force generated on a tie rod with a magnitude according to the steering torque inputted to the steering wheel by the driver and the assist torque generated by the EPS device 6.

The ECU 8 in the present embodiment controls the EPS device 6 according to the temperature of the tire 4 detected by the temperature sensor 7, i.e., based upon the SAP of the wheel 3 that is according to the temperature of the tire 4 detected by the temperature sensor 7 and that reduces with the increase in the temperature of the tire 4, thereby changing the degree of suppressing the behavior change of the vehicle 2. When using the temperature of the tire 4 detected by the temperature sensor 7, the ECU 8 may use an average of temperatures of four wheels, or use the temperature of any one of four wheels.

When the temperature of the tire 4 detected by the temperature sensor 7 is relatively high, the ECU 8 increases the degree of suppressing the behavior change of the vehicle 2 by the EPS device 6, compared to the case where the temperature of the tire 4 is relatively low. Specifically, in this case, the ECU 8 controls the EPS device 6 to relatively decrease the assist torque, thereby increasing the degree of suppressing the behavior change of the vehicle 2 to the equivalent steering input. In other words, when the temperature of the tire 4 detected by the temperature sensor 7 is relatively low, the ECU 8 decreases the degree of suppressing the behavior change of the vehicle 2 to the equivalent steering input, compared to the case where the temperature of the tire 4 is relatively high. Specifically, in this case, the ECU 8 controls the EPS device 6 to relatively increase the assist torque, thereby decreasing the degree of suppressing the behavior change of the vehicle 2 to the equivalent steering input.

The ECU 8 obtains an EPS gain based upon an EPS gain map m1 illustrated in FIG. 5, for example. In the EPS gain map m1, an abscissa axis indicates the temperature of the tire 4, and an ordinate axis indicates the EPS gain. The EPS device 6 increases the applied assist torque, as the EPS gain increases, and decreases the applied assist torque, as the EPS gain decreases. The EPS gain map m1 indicates the relationship between the temperature of the tire 4 (in other words, the SAP according to the tire temperature) and the EPS gain. The relationship between the temperature of the tire and the EPS gain is set in advance in the EPS gain map m1 in consideration of the temperature dependency of the tire characteristic, and with this state, the EPS gain map m1 is stored in a storage unit of the ECU 8. In the EPS gain map m1, the EPS gain decreases with the increase in the tire temperature, i.e., with the decrease in the SAP. The ECU 8 acquires the EPS gain from the temperature of the tire 4 detected by the temperature sensor 7 based upon the EPS gain map m1. The ECU 8 controls the EPS device 6 to adjust the assist torque based upon the acquired EPS gain, thereby adjusting the degree of suppressing the behavior change of the vehicle 2.

Specifically, as the temperature of the tire 4 relatively increases, the ECU 8 decreases the assist torque by the EPS device 6 to the equivalent steering input, and as the temperature of the tire 4 relatively decreases, the ECU 8 increases the assist torque by the EPS device 6 to the equivalent steering input. Thus, the ECU 8 increases the degree of suppressing the behavior change of the vehicle 2 by the EPS device 6, as the temperature of the tire 4 relatively increases, and decreases the degree of suppressing the behavior change of the vehicle 2 by the EPS device 6, as the temperature of the tire 4 relatively decreases.

When the SAP of the tire 4 decreases with the increase in the temperature of the tire 4, reaction force exerted from the wheel 3 that is the steered wheel toward the steering wheel 5 relatively decreases in the vehicle control system 1. Therefore, in the vehicle control system 1, in case where the driver operates the steering wheel 5 with the steering torque (operation input) equivalent to the steering torque during when the temperature of the tire 4 is relatively low, when the temperature of the tire 4 is relatively high, the turning amount increases, compared to the case of the low temperature, by the amount of the decrease in the reaction force exerted to the steering wheel 5, so that the behavior change of the vehicle 2 might be increased.

However, in the vehicle control system 1 according to the present embodiment, the ECU 8 decreases the assist torque by the EPS device 6 to the equivalent steering input, as the temperature of the tire 4 relatively increases. With this process, the degree of suppressing the behavior change of the vehicle 2 by the EPS device 6 can be increased, which prevents the behavior change in the turning direction of the vehicle 2 to the equivalent operation input from becoming large, compared to the case where the temperature of the tire 4 is low. As a result, according to the vehicle control system 1, the behavior change to the equivalent operation input during when the temperature of the tire 4 is relatively high and the behavior change to the equivalent operation input during when the temperature of the tire 4 is relatively low can be set to be almost the same.

Accordingly, the vehicle control system 1 can suppress the variation in the driving feeling involved with the change in the temperature of the tire 4, and hence, can suppress the sense of strangeness of the driver during the drive, for example. Specifically, the vehicle control system 1 can realize the uniform driving feeling, regardless of the change in the temperature of the tire 4, so that the driver can feel almost uniform driving feeling, even if the temperature of the tire 4 changes.

When the SAP of the tire 4 decreases with the increase in the temperature of the tire 4, reaction force exerted to the steering wheel 5 relatively decreases in the vehicle control system 1. Therefore, in the vehicle control system 1, in case where the driver operates the steering wheel 5 during when the temperature of the tire 4 is relatively high, the driver might feel as if the steering wheel 5 becomes light, compared to the case in which the temperature of the tire 4 is low. On the contrary, in case where the driver operates the steering wheel 5 during when the temperature of the tire 4 is relatively low, the driver might feel as if the steering wheel 5 becomes heavy, compared to the case in which the temperature of the tire 4 is high.

However, in the vehicle control system 1 according to the present embodiment, the ECU 8 decreases the assist torque by the EPS device 6 to the equivalent steering input, as the temperature of the tire 4 relatively increases. With this process, the vehicle control system 1 can reduce the assist torque according to the amount of the relative reduction in the reaction force exerted to the steering wheel 5 according to the increase in the temperature of the tire.

As a result, according to the vehicle control system 1, when the driver operates the steering wheel 5, the heaviness of the steering wheel 5, i.e., the resistance of the steering wheel 5 in the turning direction, can be set to be almost equal to each other between the case where the temperature of the tire 4 is relatively high and the case where the temperature of the tire 4 is relatively low. Specifically, the vehicle control system 1 can prevent that the steering torque that can be inputted to the steering wheel 5 for turning the wheel 3 with the same turning amount is different between the case where the temperature of the tire 4 is relatively high and the case where the temperature of the tire 4 is relatively low. Accordingly, the vehicle control system 1 can perform the temperature compensation of the steering torque to the temperature dependency of the tire characteristic in order to prevent the required steering torque from varying according to the temperature. In this viewpoint, the vehicle control system 1 can also suppress the variation in the driving feeling involved with the change in the temperature of the tire 4.

In the vehicle control system 1, the temperature sensor 7 detects the temperature in the tread, which is easy to exert influence on the tire characteristic including the CP or SAP of the tire 4, and which is less changed than the temperature on the surface of the tire 4, typically the temperature in the tread rubber, and this detected temperature is used for the control of adjusting the degree of suppressing the behavior change of the vehicle 2. Therefore, the vehicle control system 1 can enhance control precision, and effectively suppress the variation in the driving feeling.

One example of the EPS control in the vehicle control system 1 will next be described with reference to a flowchart in FIG. 6. The control routine is repeatedly executed with a control cycle of several microseconds to several tens of microseconds (the same applies to the embodiments described later). Firstly, the ECU 8 acquires the temperature of the tire 4 detected by the temperature sensor 7 (ST1). Then, the ECU 8 obtains the EPS gain from the EPS gain map m1 in FIG. 5 based upon the temperature of the tire 4 acquired in ST1 (ST2). The ECU 8 then controls the EPS device 6 based upon the EPS gain determined in ST2, thereby adjusting the assist torque by the EPS device 6 (ST3). The ECU 8 then ends the current control cycle, and moves to the next control cycle.

In the present embodiment, the ECU 8 obtains the EPS gain by using the EPS gain map m1 illustrated in FIG. 5. However, the present embodiment is not limited thereto. The ECU 8 may obtain the EPS gain based upon a formula corresponding to the EPS gain map m1 illustrated in FIG. 5, for example. The same applies to various maps described later (the same applies to the embodiments described later).

The EPS gain map m1 in FIG. 5 may describe the relationship between the SAP according to the temperature of the tire 4 and the EPS gain. In this case, the ECU 8 acquires the temperature of the tire 4 in ST1, and then, estimates the current SAP based upon the temperature of the tire. The ECU 8 may calculate the difference (deviation) between a reference SAP that is a reference set in advance and the estimated SAP, and may calculate the EPS gain by using this difference and the map (e.g., EPS gain∝reference SAP−estimated SAP).

The vehicle control system 1 according to the embodiment described above includes the EPS device 6 that can adjust the behavior of the vehicle 2, the temperature sensor 7 that detects the temperature of the tire 4 on the wheel 3 of the vehicle 2, and the ECU 8 that controls the EPS device 6 according to the temperature of the tire 4 detected by the temperature sensor 7 so as to change the degree of suppressing the behavior change of the vehicle 2 by the EPS device 6. Accordingly, the vehicle control system 1 and the ECU 8 can suppress the variation in the driving feeling.

The actuator in the vehicle control system 1 described above may be a steering device of a steer-by-wire system, instead of the EPS device 6. In this case, the steering device of the steer-by-wire system has a structure in which the steering wheel 5 serving as the steering member and the wheel 3 serving as the steered wheel are mechanically separated. In the steering device of the steer-by-wire system, when the steering wheel 5 is operated by the driver, the steering torque (operation amount) of the steering wheel 5 is detected by a sensor, and the ECU 8 drives the steering actuator such as an electric motor based upon the detected steering torque, in order to apply predetermined turning force to the steered wheel, whereby the steered wheel turns. Even if the actuator in the vehicle control system 1 is the steering device of the steer-by-wire system as described above, it can change the turning amount of the steered wheel to the steering torque to the steering wheel 5, thereby being capable of changing the steering characteristic of the vehicle 2, as in the case described above. Therefore, the degree of the behavior change of the vehicle 2, i.e., the degree of suppressing the behavior change of the vehicle 2, can be changed.

Second Embodiment

Figure 7:
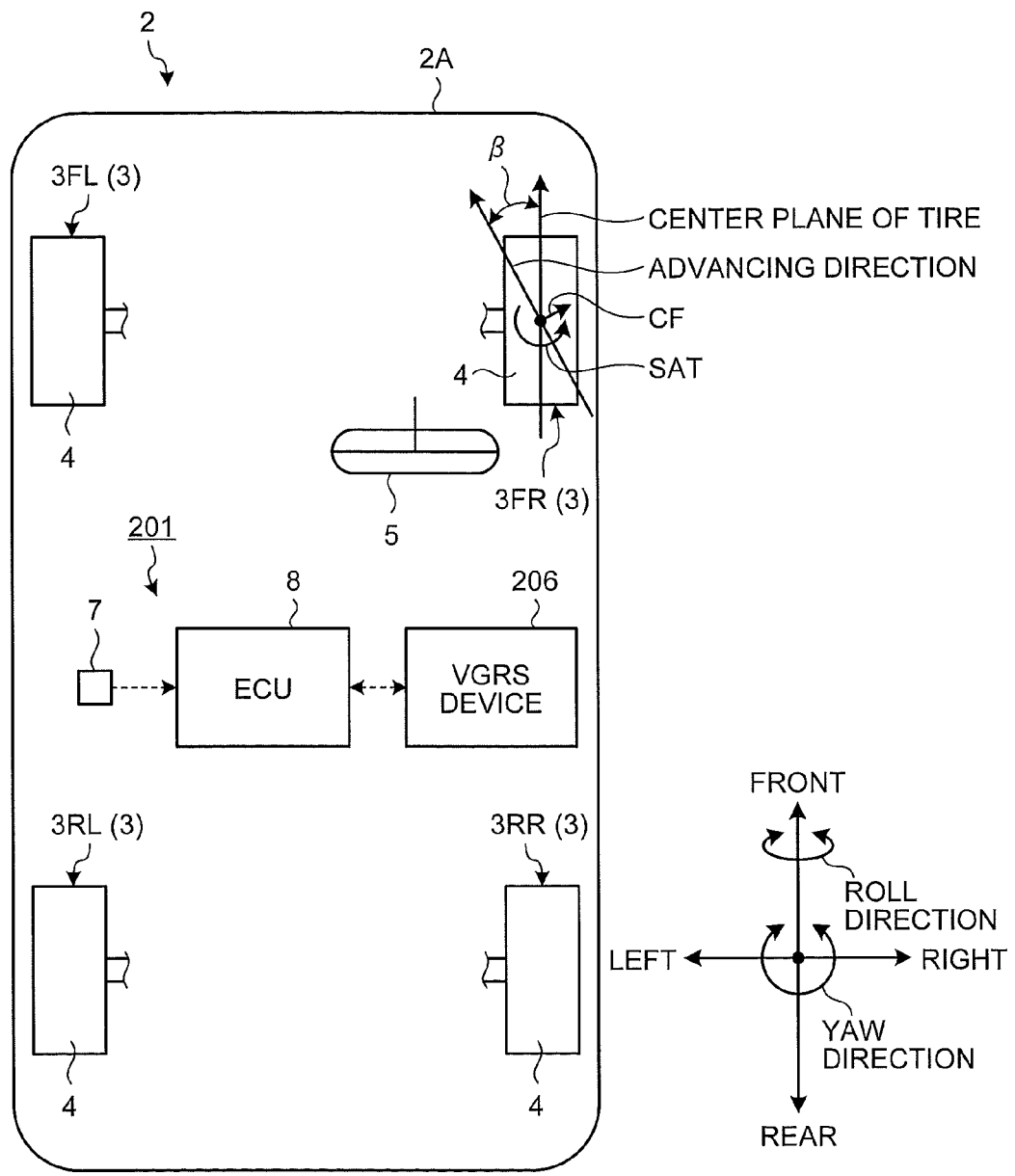
FIG. 7 is a schematic diagram illustrating a schematic configuration of a vehicle control system according to a second embodiment.
Figure 8:
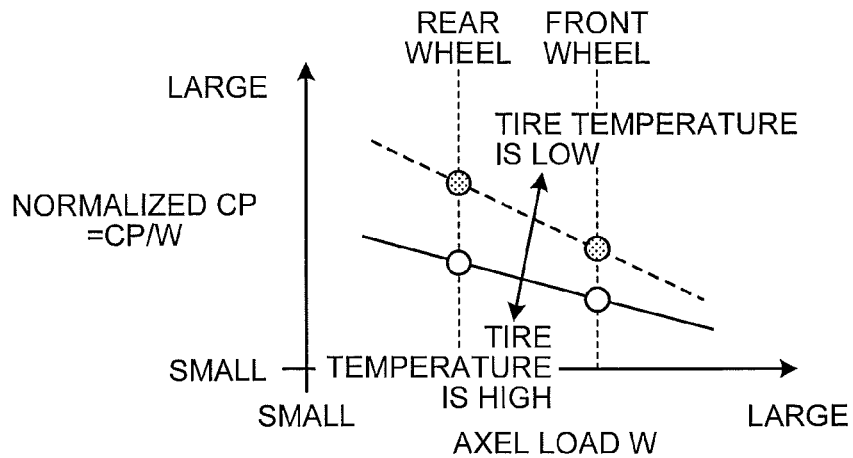
FIG. 8 is a diagram explaining a relationship between a temperature of a tire and normalized cornering power.
Figure 9:
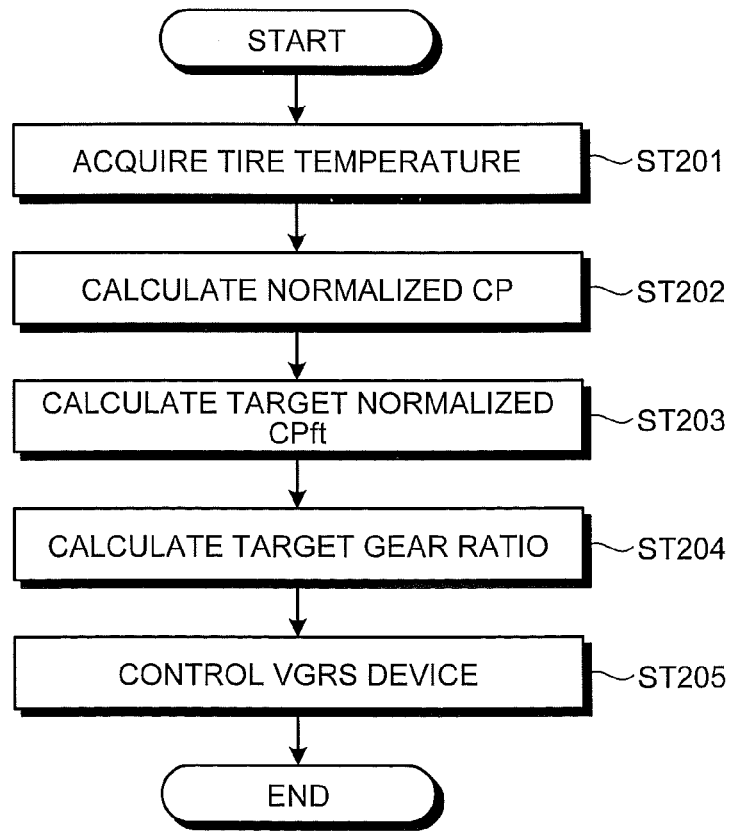
FIG. 9 is a flowchart illustrating one example of VGRS control.
Figure 10:
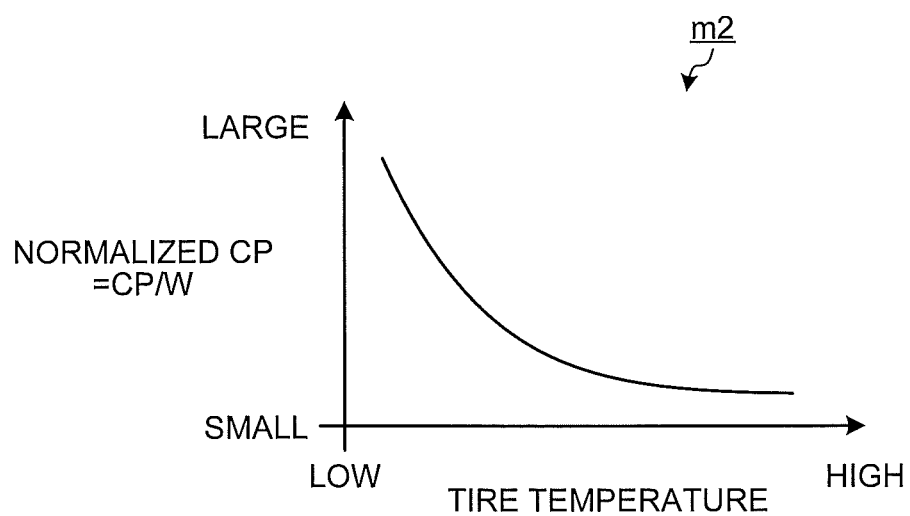
FIG. 10 is a diagram illustrating one example of a CP/W map.

FIG. 7 is a schematic diagram illustrating a schematic configuration of a vehicle control system according to a second embodiment, FIG. 8 is a diagram explaining a relationship between a temperature of a tire and normalized cornering power, FIG. 9 is a flowchart illustrating one example of VGRS control, and FIG. 10 is a diagram illustrating one example of a CP/W map. In the vehicle control system and the control device according to the second embodiment, the configuration of the actuator is different from that in the first embodiment. The redundant description for the configuration, operation, and effect same as those in the first embodiment will be skipped as much as possible (the same applies to the embodiments described later).

A vehicle control system 201 according to the present embodiment includes a variable gear ratio steering (VGRS) device (hereinafter referred to as "VGRS device", unless otherwise specified) 206 as the actuator as illustrated in FIG. 7. When the ECU 8 serving as the control device controls the VGRS device 206 according to the temperature of the tire 4, the vehicle control system 201 compensates the deterioration in the tire characteristic caused by the increased temperature of the tire by the change in the vehicle characteristic, in order to suppress the variation in the driving feeling.

The VGRS device 206 is arranged on a steering system between the steering wheel 5 and the wheel 3 (e.g., the front-left wheel 3FL, the front-right wheel 3FR) serving as the steered wheel, and it can change a steering gear ratio (hereinafter referred to as "gear ratio", unless otherwise specified) of the steering wheel 5. The VGRS device 206 changes the gear ratio according to the driving condition, thereby being capable of changing the turning amount (steering angle) of the steered wheel or the turning speed (steering speed) to the input of the steering torque to the steering wheel 5. The VGRS device 206 is connected to the ECU 8, and controlled by the ECU 8.

The VGRS device 206 can adjust the behavior of the vehicle 2, in other words. In the present embodiment, the VGRS device 206 can change the degree of suppressing the behavior change of the vehicle 2. The VGRS device 206 can change the degree of the behavior change of the vehicle 2, i.e., the degree of suppressing the behavior change of the vehicle 2, by changing the steering characteristic of the vehicle 2. The VGRS device 206 changes the gear ratio to change the steering characteristic of the vehicle 2, thereby being capable of changing a balance between slip angles of the front-left wheel 3FL and the front-right wheel 3FR and slip angles of the rear-left wheel 3RL and the rear-right wheel 3RR during when the equivalent steering torque is applied to the steering wheel 5 by the driver. By virtue of this process, the VGRS device 206 can adjust the degree of suppressing the behavior change of the vehicle 2.

The ECU 8 in the present embodiment controls the VGRS device 206 according to the temperature of the tire 4 detected by the temperature sensor 7, i.e., based upon the CP of the wheel 3 that is according to the temperature of the tire 4 detected by the temperature sensor 7 and that reduces with the increase in the temperature of the tire 4, thereby changing the degree of suppressing the behavior change of the vehicle 2. When the temperature of the tire 4 detected by the temperature sensor 7 is relatively high, the ECU 8 controls the VGRS device 206 to adjust the slip angle balance between the front wheels and rear wheels, thereby increasing the degree of suppressing the behavior change of the vehicle 2 by the VGRS device 206, compared to the case where the temperature of the tire 4 is relatively low. In other words, when the temperature of the tire 4 detected by the temperature sensor 7 is relatively low, the ECU 8 controls the VGRS device 206 to adjust the slip angle balance between the front wheels and rear wheels, thereby decreasing the degree of suppressing the behavior change of the vehicle 2 by the VGRS device 206, compared to the case where the temperature of the tire 4 is relatively high. Specifically, the ECU 8 increases the degree of suppressing the behavior change of the vehicle 2 by the VGRS device 206, as the temperature of the tire 4 relatively increases, and decreases the degree of suppressing the behavior change of the vehicle 2 by the VGRS device 206, as the temperature of the tire 4 relatively decreases.

As illustrated in FIG. 8, when the temperature of the tire 4 increases, and with this increase, the CP of the tire 4 decreases, the so-called normalized cornering power (hereinafter referred to as "normalized CP", unless otherwise specified) also decreases in the vehicle control system 201. The normalized CP can be expressed by "CP/W", when the axle load is defined as "W". The range of the decrease in the normalized CP with the temperature rise of the tire 4 is different depending upon the axle load W, and hence, it is different between the front wheels and the rear wheels of the vehicle 2.

A stability factor Kh has been known as a parameter indicating the turning characteristic of the vehicle 2 or driving stability. The stability factor Kh can be represented by a formula (1) described below, for example. In the formula (1), "g" represents gravitational acceleration, "l" represents a wheel base of the vehicle 2, "equivalent CPf" represents an equivalent CP on the front wheels of the vehicle 2, "equivalent CPr" represents an equivalent CP on the rear wheels of the vehicle 2, "Wf" represents the axle load on the front wheels of the vehicle 2, and "Wr" represents the axle load on the rear wheels of the vehicle 2. In the formula (1), "equivalent CPf/Wf" and "equivalent CPr/Wr" respectively correspond to the normalized equivalent CP.

$$Kh=[1/(g \cdot l)] \cdot [\{1/(\text{equivalent } CPf/Wf)\}-\{1/(\text{equivalent } CPr/Wr)\}] \qquad (1)$$

The above-mentioned equivalent CP is the CP considering the influence of a so-called roll steer and compliance steer, and in other words, the CP when the roll characteristic or suspension characteristic of the vehicle 2 is supposed to be taken into the tire characteristic. In the present embodiment, the suspension of the vehicle 2 is a suspension device present between the wheel 3 and a vehicle body 2A, and eases impact or vibration transmitted to the vehicle body 2A from the road surface. The roll steer of the vehicle 2 corresponds to a toe angle change (or slip angle change) generated with a roll motion of the vehicle body 2A of the vehicle 2 in the roll direction, and the compliance steer of the vehicle 2 corresponds to a toe angle change (or slip angle change) generated due to a deformation of each unit such as a suspension bush of the vehicle 2.

When the temperature of the tire 4 is changed in case it is supposed that the condition other than the temperature of the tire 4 is not changed, the equivalent CP changes because the normalized CP changes, and the balance between the equivalent CPf and the equivalent CPr changes due to the situation in which the range of the change of the normalized CP is different between the front wheels and the rear wheels, resulting in that the stability factor Kh represented by the formula (1) might be changed. As illustrated in FIG. 8, in the case where the axle load on the front wheel is larger than the axle load on the rear wheel, the stability factor Kh tends to relatively increase when the temperature of the tire 4 is relatively low, while the stability factor Kh tends to relatively decrease when the temperature of the tire 4 is relatively high. As a result, in the vehicle control system 1, when the driver operates the steering wheel with the steering torque (operation input) equivalent to that during when the temperature of the tire 4 is relatively low in the case where the CP of the tire 4 decreases due to the increase in the temperature of the tire 4, the motion of the vehicle 2 in the yaw direction increases by the amount of the relative decrease in the stability factor Kh, i.e., the behavior change of the vehicle 2 in the yaw direction might increase, compared to the case in which the temperature of the tire 4 is low.

However, when the temperature of the tire 4 detected by the temperature sensor 7 is relatively high, the vehicle control system 201 according to the present embodiment controls the gear ratio of the VGRS device 206 to adjust the slip angle balance between the front wheels and the rear wheels, thereby increasing the degree of suppressing the behavior change of the vehicle by the VGRS device 206, compared to the case in which the temperature of the tire 4 is relatively low. Accordingly, the vehicle control system 201 can appropriately adjust the balance between the equivalent CPf and the equivalent CPr in the formula (1). In other words, in the vehicle control system 201, the ECU 8 controls the gear ratio of the VGRS device 206 to equivalently adjust the [CPf/Wf] on the front wheel according to the change in the temperature of the tire 4, in order that the stability factor Kh becomes constant with respect to the change in the temperature of the tire 4. Specifically, since the vehicle control system 201 controls the VGRS device 206 to adjust the slip angle balance between the front wheels and the rear wheels according to the change in the temperature of the tire 4, it can appropriately adjust the balance between the equivalent CPf and the equivalent CPr according to the change in the normalized CP, even if the normalized CP is changed due to the change in the temperature of the tire 4.

Thus, the vehicle control system 201 can make the stability factor Kh when the temperature of the tire 4 is relatively high and the stability factor Kh when the temperature of the tire 4 is relatively low almost equal to each other. Therefore, the vehicle control system 201 can stabilize the stability factor Kh, regardless of the temperature of the tire 4. Consequently, the vehicle control system 201 can perform the temperature compensation of the stability factor Kh to the temperature dependency of the tire characteristic in order to prevent the stability factor Kh from varying according to the temperature.

Since the ECU 8 increases the degree of suppressing the behavior change of the vehicle 2 by the VGRS device 206 to the equivalent steering input as the temperature of the tire 4 relatively increases, for example, the vehicle control system 201 can stabilize the stability factor Kh, regardless of the temperature of the tire 4. Therefore, the vehicle control system 201 can suppress the behavior change of the vehicle, in the present embodiment, can suppress the increase in the motion in the yaw direction, to the equivalent operation input, compared to the case where the temperature is low. As a result, the vehicle control system 201 can make the behavior change when the temperature of the tire is relatively high and the behavior change when the temperature of the tire is relatively low almost equal to each other to the equivalent operation input.

Accordingly, the vehicle control system 201 can suppress the variation in the driving feeling involved with the change in the temperature of the tire 4, and hence, can suppress the sense of strangeness of the driver during the drive, for example.

One example of the VGRS control in the vehicle control system 201 will next be described with reference to a flowchart in FIG. 9. Firstly, the ECU 8 acquires the temperature of the tire 4 detected by the temperature sensor 7 (ST201). Then, the ECU 8 obtains the normalized CPf=CPf/Wf of the front wheel and the normalized CPr=CPr/Wr of the rear wheel based upon the temperature of the tire 4 acquired in ST1 (ST202).

The ECU 8 obtains the normalized CP of the front wheel and the normalized CP of the rear wheel by using a CP/W map m2 illustrated in FIG. 10. In the CP/W map m2, an abscissa axis indicates the temperature of the tire 4, and an ordinate axis indicates the normalized CP=CP/W. The CP/W map m2 describes the relationship between the temperature of the tire 4 and the normalized CP. The relationship between the temperature of the tire and the normalized CP is set in advance in the CP/W map m2 in consideration of the temperature dependency of the tire characteristic, and with this state, the CP/W map m2 is stored in a storage unit of the ECU 8. In the CP/W map m2, the normalized CP decreases with the increase in the tire temperature. The ECU 8 acquires the normalized CP from the temperature of the tire 4 detected by the temperature sensor 7 based upon the CP/W map m2. The ECU 8 calculates the normalized CPf of the front wheel from the temperature of the tire 4 on the front wheel based upon the CP/W map m2 for the front wheel, and calculates the normalized CPr of the rear wheel from the temperature of the tire 4 on the rear wheel based upon the CP/W map m2 for the rear wheel.

The ECU 8 then acquires a target normalized CPft of the front wheel based upon the normalized CPr acquired in ST202 and a target stability factor Kht (ST203). The target stability factor Kht is the factor set in advance according to the required characteristic of the vehicle 2. The target normalized CPft of the front wheel is the normalized CPf of the front wheel that is the target for the control. The ECU 8 calculates the target normalized CPft of the front wheel, wherein Kh=Kht, equivalent CPr/Wr=normalized CPr, and equivalent CPf/Wf=normalized CPft in the formula (1).

Then, the ECU 8 calculates a target gear ratio based upon the normalized CPf of the front wheel acquired in ST202, and the target normalized CPft of the front wheel acquired in ST203 in order that the normalized CPf of the front wheel equivalently becomes the target normalized CPft (ST204). The ECU 8 calculates the target gear ratio by using [target gear ratio=reference gear ratio (reference gear ratio set in advance)×(normalized CPf of front wheel/target normalized CPft of front wheel)], or [target gear ratio=reference gain (reference gain set in advance)×(target normalized CPft of front wheel−normalized CPf of front wheel)].

The ECU 8 controls the VGRS device 206 based upon the target gear ratio acquired in ST204 to adjust the slip angle balance between the front wheel and the rear wheel by the VGRS device 206, thereby adjusting the balance between the equivalent CPf and the equivalent CPr (ST205). Then the ECU 8 ends the current control cycle, and moves to the next control cycle.

The vehicle control system 201 according to the embodiment described above includes the VGRS device 206 that can adjust the behavior of the vehicle 2, the temperature sensor 7 that detects the temperature of the tire 4 on the wheel 3 of the vehicle 2, and the ECU 8 that controls the VGRS device 206 according to the temperature of the tire 4 detected by the temperature sensor 7 so as to change the degree of suppressing the behavior change of the vehicle 2 by the VGRS device 206. Accordingly, the vehicle control system 201 and the ECU 8 can suppress the variation in the driving feeling.

Third Embodiment

Figure 11:
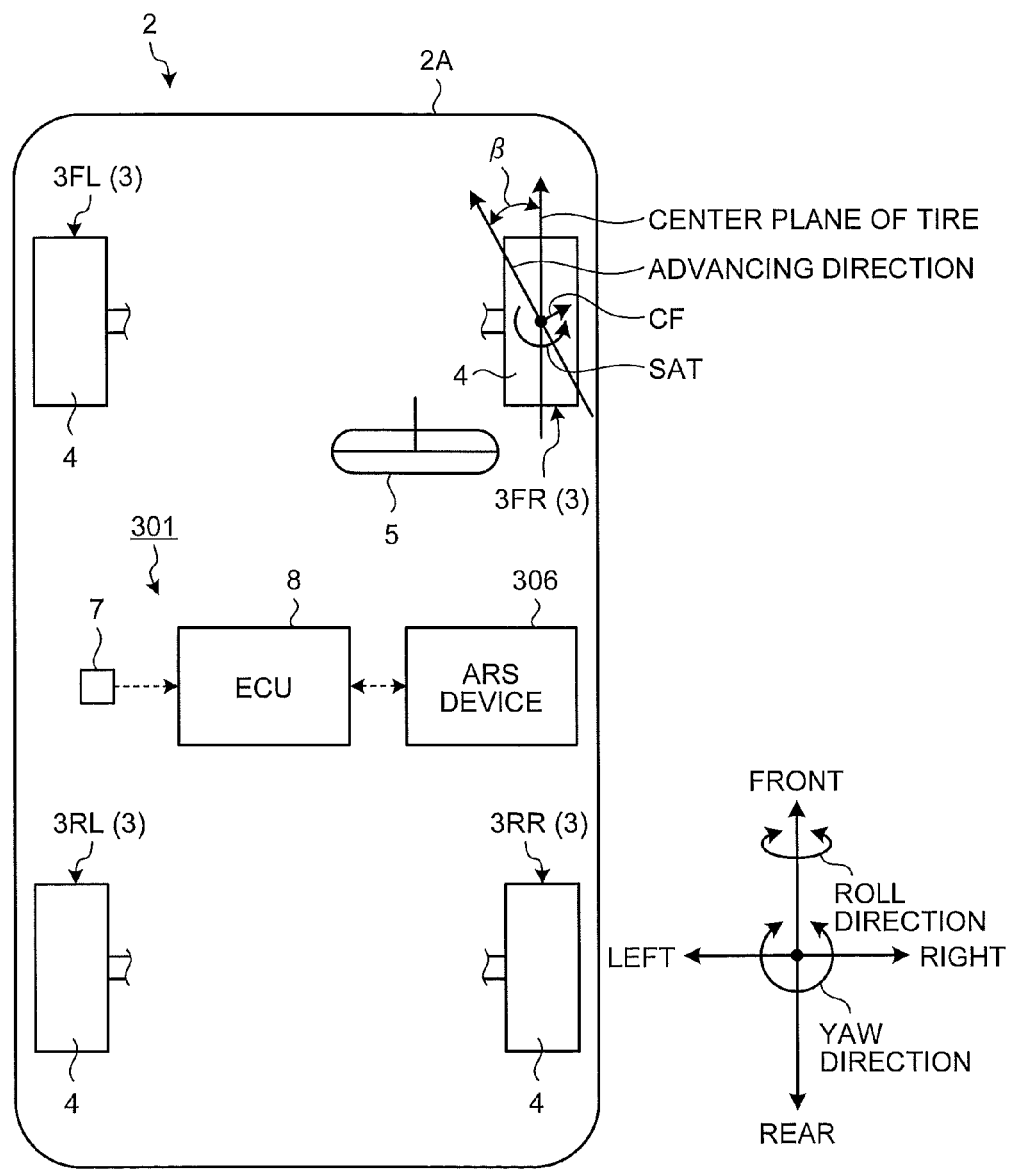
FIG. 11 is a schematic diagram illustrating a schematic configuration of a vehicle control system according to a third embodiment.
Figure 12:
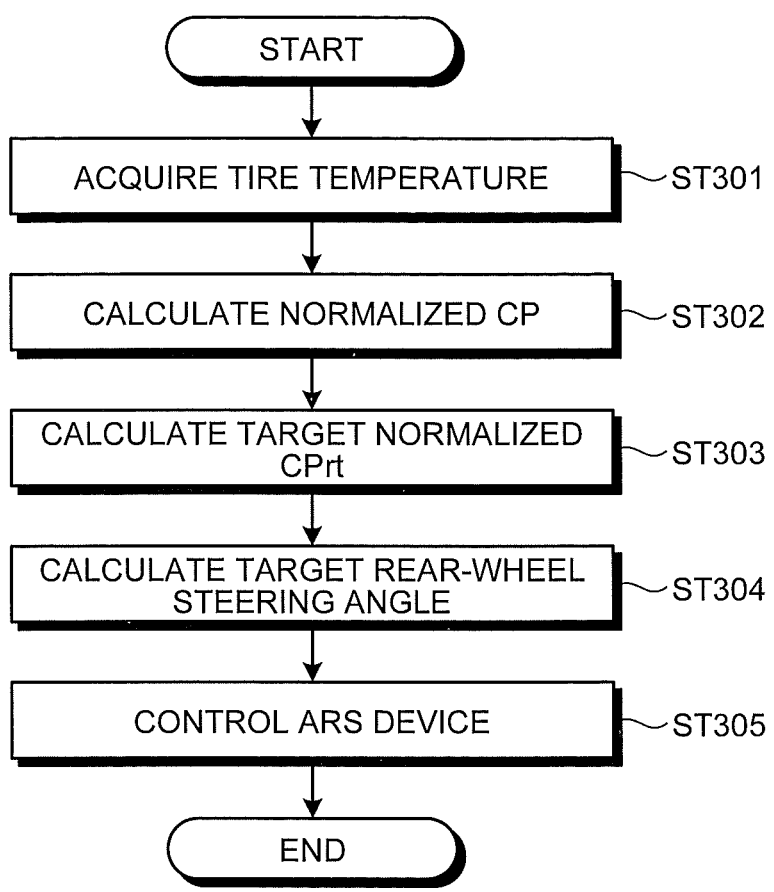
FIG. 12 is a flowchart illustrating one example of ARS control.

FIG. 11 is a schematic diagram illustrating a schematic configuration of a vehicle control system according to a third embodiment, and FIG. 12 is a flowchart illustrating one example of ARS control. In the vehicle control system and the control device according to the third embodiment, the structure of the actuator is different from that in the second embodiment.

A vehicle control system 301 according to the present embodiment includes an active rear steering (ARS) device (hereinafter referred to as ARS device unless otherwise specified) 306 as the actuator as illustrated in FIG. 11. The ECU 8 serving as the control device controls the ARS device 306 according to the temperature of the tire 4, whereby the vehicle control system 301 compensates the deterioration in the tire characteristic due to the increased tire temperature by the change in the characteristic of the vehicle, so as to suppress the variation in the driving feeling.

The ARS device 306 steers the rear-left wheel 3RL and the rear-right wheel 3RR as steered wheels. For example, the ARS device 306 steers the front-left wheel 3FL and the front-right wheel 3FR with the phase same as the steering angle or reverse to the steering angle according to the driving condition (e.g., vehicle speed or turning state) of the vehicle 2. The ARS device 306 is connected to the ECU 8, and controlled by the ECU 8.

The ARS device 306 can adjust the behavior of the vehicle 2, in other words. In the present embodiment, the ARS device 306 can change the degree of suppressing the behavior change of the vehicle 2. The ARS device 306 adjusts the steering angles and the turning amounts of the rear-left wheel 3RL and the rear-right wheel 3RR to the steering torque applied to the steering wheel by the driver, thereby being capable of changing the slip angle balance between the slip angles of the front-left wheel 3FL and the front-right wheel 3FR and the slip angles of the rear-left wheel 3RL and the rear-right wheel 3RR when the equivalent steering torque is applied to the steering wheel 5 by the driver. Thus, the ARS device 306 can change the degree of suppressing the behavior change of the vehicle 2.

The ECU 8 in the present embodiment controls the ARS device 306 according to the temperature of the tire 4 detected by the temperature sensor 7, i.e., based upon the CP of the wheel 3 that is according to the temperature of the tire 4 detected by the temperature sensor 7 and that reduces with the increase in the temperature of the tire 4, thereby changing the degree of suppressing the behavior change of the vehicle 2. When the temperature of the tire 4 detected by the temperature sensor 7 is relatively high, the ECU 8 controls the ARS device 306 to adjust the slip angle balance between the front wheels and rear wheels, thereby increasing the degree of suppressing the behavior change of the vehicle 2 by the ARS device 306, compared to the case where the temperature of the tire 4 is relatively low. Specifically, the ECU 8 increases the degree of suppressing the behavior change of the vehicle 2 by the ARS device 306, as the temperature of the tire 4 relatively increases, and decreases the degree of suppressing the behavior change of the vehicle 2 by the ARS device 306, as the temperature of the tire 4 relatively decreases.

When the temperature of the tire 4 detected by the temperature sensor 7 is relatively high, the vehicle control system 301 according to the present embodiment controls the rear-wheel steering angle of the ARS device 306 to adjust the slip angle balance between the front wheels and the rear wheels, thereby increasing the degree of suppressing the behavior change of the vehicle by the ARS device 306, compared to the case in which the temperature of the tire 4 is relatively low. Accordingly, the vehicle control system 301 can appropriately adjust the balance between the equivalent CPf and the equivalent CPr in the formula (1). In other words, in the vehicle control system 301, the ECU 8 controls the rear-wheel steering angle of the ARS device 306 to equivalently adjust the [CPr/Wr] of the rear wheel according to the change in the temperature of the tire 4 in order that the stability factor Kh becomes constant with respect to the change in the temperature of the tire 4.

Thus, the vehicle control system 301 can make the stability factor Kh when the temperature of the tire 4 is relatively high and the stability factor Kh when the temperature of the tire 4 is relatively low almost equal to each other. Therefore, the vehicle control system 301 can perform the temperature compensation of the stability factor Kh to the temperature dependency of the tire characteristic in order to prevent the stability factor Kh from varying according to the temperature. The vehicle control system 301 can make the behavior change when the temperature of the tire is relatively high and the behavior change when the temperature of the tire is relatively low, i.e., the motions in the yaw direction, almost equal to each other to the equivalent operation input. Accordingly, the vehicle control system 301 can suppress the variation in the driving feeling involved with the change in the temperature of the tire 4, and hence, can suppress the sense of strangeness of the driver during the drive, for example.

One example of the ARS control in the vehicle control system 301 will next be described with reference to a flowchart in FIG. 12. Firstly, the ECU 8 acquires the temperature of the tire 4 detected by the temperature sensor 7 (ST301). Then, the ECU 8 calculates the normalized CPf of the front wheel from the temperature of the tire 4 of the front wheel acquired in ST301 based upon the CP/W map m2 (see FIG. 10) for the front wheel and the normalized CPr of the rear wheel from the temperature of the tire 4 on the rear wheel acquired in ST301 based upon the CP/W map m2 for the rear wheel (ST302).

The ECU 8 then acquires the target normalized CPrt of the rear wheel based upon the normalized CPf acquired in ST302 and the target stability factor Kht (ST303). The ECU 8 calculates the target normalized CPrt of the rear wheel, wherein Kh=Kht, equivalent CPf/Wf=normalized CPf, and equivalent CPr/Wr=normalized CPrt in the formula (1).

Then, the ECU 8 calculates a target rear-wheel steering angle based upon the normalized CPr of the rear wheel acquired in ST302, and the target normalized CPrt of the rear wheel acquired in ST303 in order that the normalized CPr of the rear wheel equivalently becomes the target normalized CPrt (ST304). For example, the ECU 8 calculates the target rear-wheel steering angle by using [target rear-wheel steering angle=reference gain (reference gain set in advance)×(target normalized CPrt of rear wheel−normalized CPr of rear wheel)].

The ECU 8 controls the ARS device 306 based upon the target rear-wheel steering angle acquired in ST304 to adjust the slip angle balance between the front wheel and the rear wheel by the ARS device 306, thereby adjusting the balance between the equivalent CPf and the equivalent CPr (ST305). Then the ECU 8 ends the current control cycle, and moves to the next control cycle.

The vehicle control system 301 according to the embodiment described above includes the ARS device 306 that can adjust the behavior of the vehicle 2, the temperature sensor 7 that detects the temperature of the tire 4 on the wheel 3 of the vehicle 2, and the ECU 8 that controls the ARS device 306 according to the temperature of the tire 4 detected by the temperature sensor 7 so as to change the degree of suppressing the behavior change of the vehicle 2 by the ARS device 306. Accordingly, the vehicle control system 301 and the ECU 8 can suppress the variation in the driving feeling.

Fourth Embodiment

Figure 13:
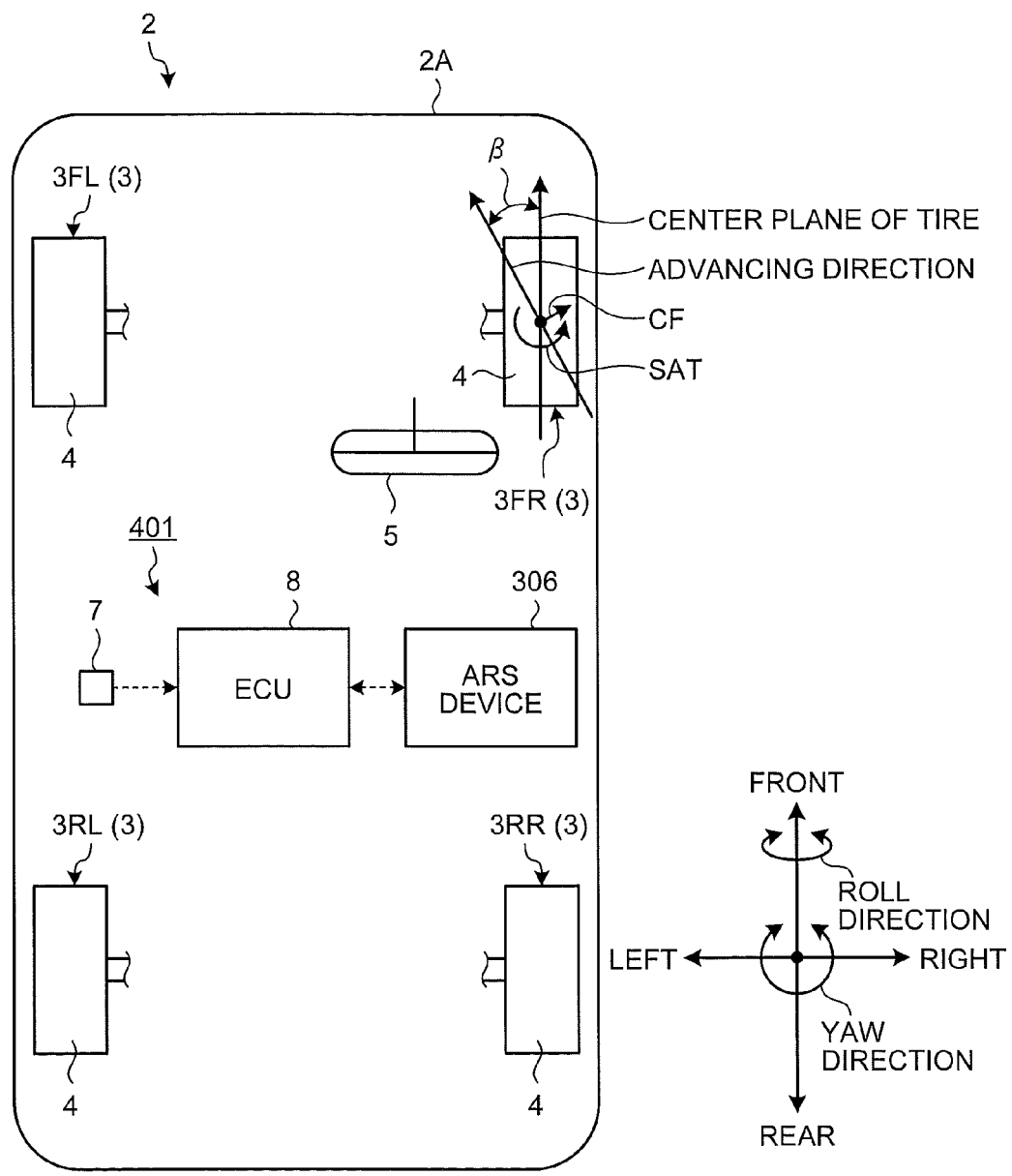
FIG. 13 is a schematic diagram illustrating a schematic configuration of a vehicle control system according to a fourth embodiment.
Figure 14:
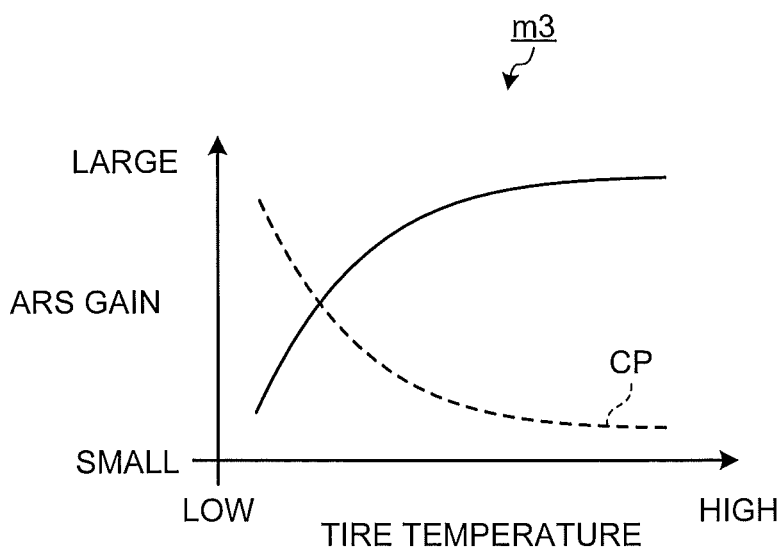
FIG. 14 is a diagram illustrating one example of an ARS gain.
Figure 15:
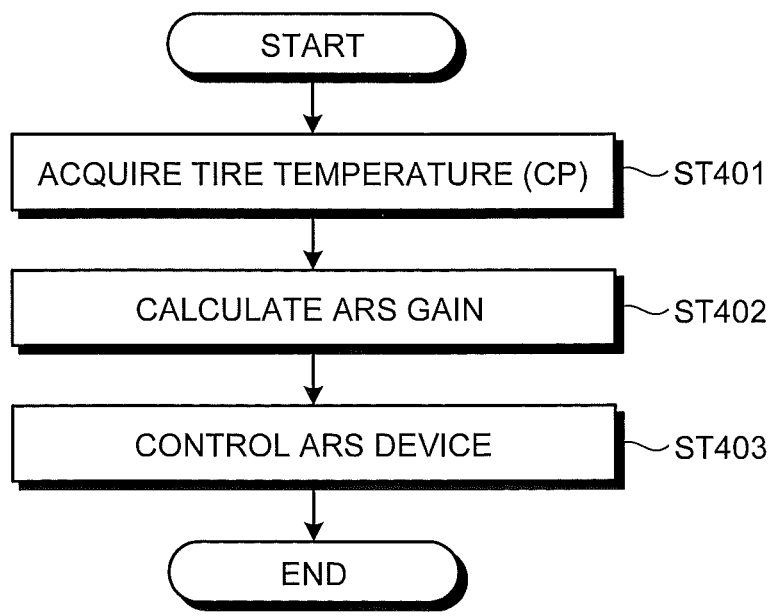
FIG. 15 is a flowchart illustrating one example of ARS control.

FIG. 13 is a schematic diagram illustrating a schematic configuration of a vehicle control system according to a fourth embodiment, FIG. 14 is a diagram illustrating one example of an ARS gain, and FIG. 15 is a flowchart illustrating one example of ARS control. In the vehicle control system and the control device according to the fourth embodiment, the structure of the actuator is different from that in the third embodiment.

A vehicle control system 401 according to the present embodiment includes an ARS device 306 as the actuator as illustrated in FIG. 13. The ECU 8 serving as the control device controls the ARS device 306 according to the temperature of the tire 4, whereby the vehicle control system 301 compensates the deterioration in the tire characteristic due to the increased tire temperature by the change in the characteristic of the vehicle, so as to suppress the variation in the driving feeling.

The ARS device 306 can change the slip angles of the rear-left wheel 3RL and the rear-right wheel 3RR of the vehicle 2 by adjusting the steering angles and the turning amounts of the rear-left wheel 3RL and the rear-right wheel 3RR to the steering torque applied to the steering wheel 5 by the driver. Thus, the ARS device 306 can adjust the degree of suppressing the behavior change of the vehicle 2.

The ECU 8 in the present embodiment can control the ARS device 306 to change the degree of suppressing the behavior change of the vehicle 2 according to the temperature of the tire 4 detected by the temperature sensor 7, in other words, based upon the CP of the wheel 3 that is according to the temperature of the tire 4 detected by the temperature sensor 7 and that reduces with the increase in the temperature of the tire 4.

When the temperature of the tire 4 detected by the temperature sensor 7 is relatively high, the ECU 8 increases the degree of suppressing the behavior change of the vehicle 2 by the ARS device 306, compared to the case where the temperature of the tire 4 is relatively low. Specifically, in this case, the ECU 8 controls the ARS device 306 to increase the slip angle of the rear wheel of the vehicle 2, compared to the case where the temperature of the tire 4 is relatively low, thereby increasing the degree of suppressing the behavior change of the vehicle 2 by the ARS device 306 to the equivalent input. In other words, when the temperature of the tire 4 detected by the temperature sensor 7 is relatively low, the ECU 8 decreases the degree of suppressing the behavior change of the vehicle 2 by the ARS device 306, compared to the case where the temperature of the tire 4 is relatively high. Specifically, in this case, the ECU 8 controls the ARS device 306 to decrease the slip angle of the rear wheel of the vehicle 2, compared to the case where the temperature of the tire 4 is relatively high, thereby decreasing the degree of suppressing the behavior change of the vehicle 2 by the ARS device 306 to the equivalent input.

The ECU 8 obtains an ARS gain based upon an ARS gain map m3 illustrated in FIG. 14, for example. In the ARS gain map m3, an abscissa axis indicates the temperature of the tire 4, and an ordinate axis indicates the ARS gain. The ARS device 306 increases the rear-wheel steering angle of the vehicle 2 to increase the slip angle of the rear wheel, as the ARS gain increases, and decreases the rear-wheel steering angle of the vehicle 2 to decrease the slip angle of the rear wheel, as the ARS gain decreases. The ARS gain map m3 indicates the relationship between the temperature of the tire 4 (in other words, the CP according to the tire temperature) and the ARS gain. The relationship between the temperature of the tire and the ARS gain is set in advance in the ARS gain map m3 in consideration of the temperature dependency of the tire characteristic, and with this state, the ARS gain map m3 is stored in a storage unit of the ECU 8. In the ARS gain map m3, the ARS gain increases with the increase in the tire temperature, i.e., with the decrease in the CP. The ECU 8 acquires the ARS gain from the temperature of the tire 4 detected by the temperature sensor 7 based upon the ARS gain map m3. The ECU 8 controls the ARS device 306 to adjust the slip angle of the rear wheel of the vehicle 2 based upon the acquired ARS gain, thereby adjusting the degree of suppressing the behavior change of the vehicle 2.

Specifically, as the temperature of the tire 4 relatively increases, the ECU 8 increases the slip angle of the rear wheel of the vehicle 2 by the ARS device 306, and as the temperature of the tire 4 relatively decreases, the ECU 8 decreases the slip angle of the rear wheel of the vehicle 2 by the ARS device 306. Thus, the ECU 8 increases the degree of suppressing the behavior change of the vehicle 2 by the ARS device 306, as the temperature of the tire 4 relatively increases, and decreases the degree of suppressing the behavior change of the vehicle 2 by the ARS device 306, as the temperature of the tire 4 relatively decreases.

When the CP of the tire 4 decreases with the increase in the temperature of the tire 4, the equivalent CP of the rear wheel of the vehicle 2 when the roll characteristic or suspension characteristic of the vehicle 2 considering the influence of a so-called roll steer and compliance steer is supposed to be taken into the tire characteristic might be reduced. Therefore, when disturbance input such as an operation input or crosswind is exerted on the vehicle body 2A in case where the temperature of the tire 4 is relatively high, the motion of the vehicle 2 in the yaw direction increases by the relative decrease in the equivalent CP on the rear wheel, compared to the case where the temperature of the tire 4 is low, i.e., the behavior change of the vehicle 2 in the yaw direction might increase.

However, when the temperature of the tire 4 detected by the temperature sensor 7 becomes relatively high, the vehicle control system 401 according to the present embodiment increases the rear-wheel steering angle by the ARS device 306 to increase the slip angle of the rear wheel, thereby increasing the degree of suppressing the behavior change of the vehicle by the ARS device 306. Therefore, the vehicle control system 401 can prevent the behavior change of the vehicle 2 from increasing to the equivalent input, compared to the case in which the temperature of the tire 4 is relatively low. In other words, in the vehicle control system 401, the ECU 8 controls the rear-wheel steering angle of the ARS device 306 for adjusting the slip angle of the rear wheel, so as to equivalently adjust the CP on the rear wheel according to the change in the temperature of the tire 4, in order that the equivalent CP on the rear wheel of the vehicle 2 becomes constant with respect to the change in the temperature of the tire 4. Specifically, since the vehicle control system 401 controls the rear-wheel steering angle of the ARS device 306 for adjusting the slip angle of the rear wheel according to the change in the temperature of the tire 4, it can appropriately adjust the slip angle of the rear wheel according to the change in the CP to make the equivalent CP on the rear wheel of the vehicle 2 almost constant, even if the CP is changed due to the change in the temperature of the tire 4.

Thus, the vehicle control system 401 can make the equivalent CP on the rear wheel when the temperature of the tire 4 is relatively high and the equivalent CP on the rear wheel when the temperature of the tire 4 is relatively low almost equal to each other. Therefore, the vehicle control system 401 can stabilize the equivalent CP on the rear wheel, regardless of the temperature of the tire 4. Consequently, the vehicle control system 401 can perform the temperature compensation of the equivalent CP on the rear wheel to the temperature dependency of the tire characteristic in order to prevent the equivalent CP on the rear wheel from varying according to the temperature.

Since the ECU 8 increases the degree of suppressing the behavior change of the vehicle 2 by the ARS device 306 as the temperature of the tire 4 relatively increases, for example, the vehicle control system 401 can stabilize the equivalent CP on the rear wheel, regardless of the temperature of the tire 4. Therefore, the vehicle control system 401 can suppress the behavior change of the vehicle, in the present embodiment, can suppress the increase in the motion in the yaw direction, to the equivalent operation input, compared to the case where the temperature is low. As a result, the vehicle control system 401 can make the behavior change when the temperature of the tire is relatively high and the behavior change when the temperature of the tire is relatively low, i.e., the motions of the vehicle 2 in the yaw direction, almost equal to each other to the equivalent operation input.

Accordingly, the vehicle control system 401 can suppress the variation in the driving feeling involved with the change in the temperature of the tire 4, and hence, can suppress the sense of strangeness of the driver during the drive, for example.

One example of the ARS control in the vehicle control system 401 will next be described with reference to a flowchart in FIG. 15. Firstly, the ECU 8 acquires the temperature of the tire 4 detected by the temperature sensor 7 (ST401). The ECU 8 obtains the ARS gain based upon the ARS gain map m3 illustrated in FIG. 14, for example, based upon the temperature of the tire 4 on the rear wheel acquired in ST401 (ST402). Then, the ECU 8 controls the ARS device 306 based upon the ARS gain determined in ST402 to adjust the rear-wheel steering angle by the ARS device 306 for adjusting the slip angle of the rear wheel (ST403), ends the current control cycle, and moves to the next control cycle.

The ARS gain map m3 in FIG. 14 may describe the relationship between the CP according to the temperature of the tire 4 and the ARS gain. In this case, the ECU 8 acquires the temperature of the tire 4 in ST401, and then, estimates the current CP based upon the temperature of the tire. The ECU 8 may calculate the difference (deviation) between a reference CP that is a reference set in advance and the estimated CP, and may calculate the ARS gain by using this difference and the map (e.g., ARS gain∝reference CP−estimated CP).

The vehicle control system 401 according to the embodiment described above includes the ARS device 306 that can adjust the behavior of the vehicle 2, the temperature sensor 7 that detects the temperature of the tire 4 on the wheel 3 of the vehicle 2, and the ECU 8 that controls the ARS device 306 according to the temperature of the tire 4 detected by the temperature sensor 7 so as to change the degree of suppressing the behavior change of the vehicle 2 by the ARS device 306. Accordingly, the vehicle control system 401 and the ECU 8 can suppress the variation in the driving feeling.

Fifth Embodiment

Figure 16:
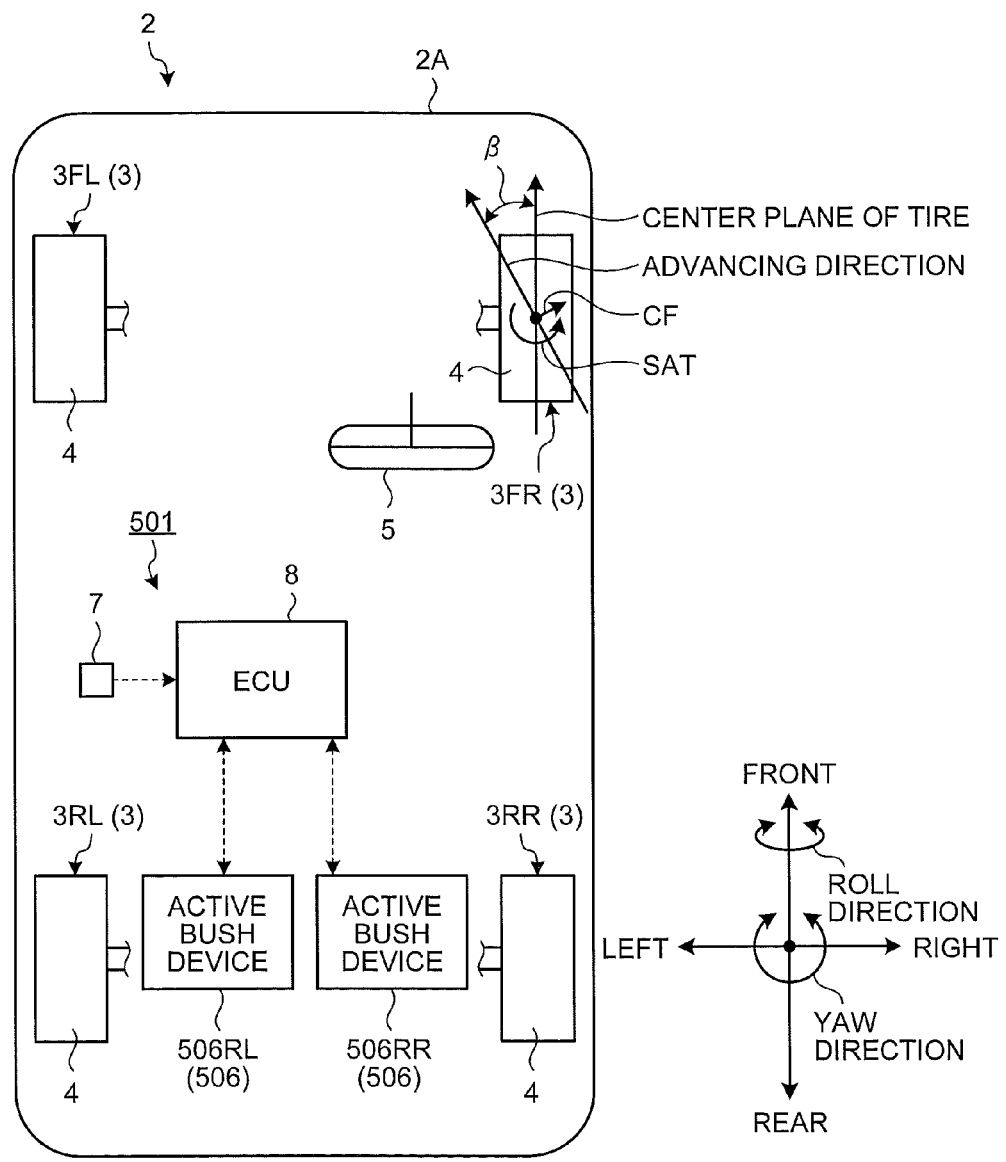
FIG. 16 is a schematic diagram illustrating a schematic configuration of a vehicle control system according to a fifth embodiment.
Figure 17:
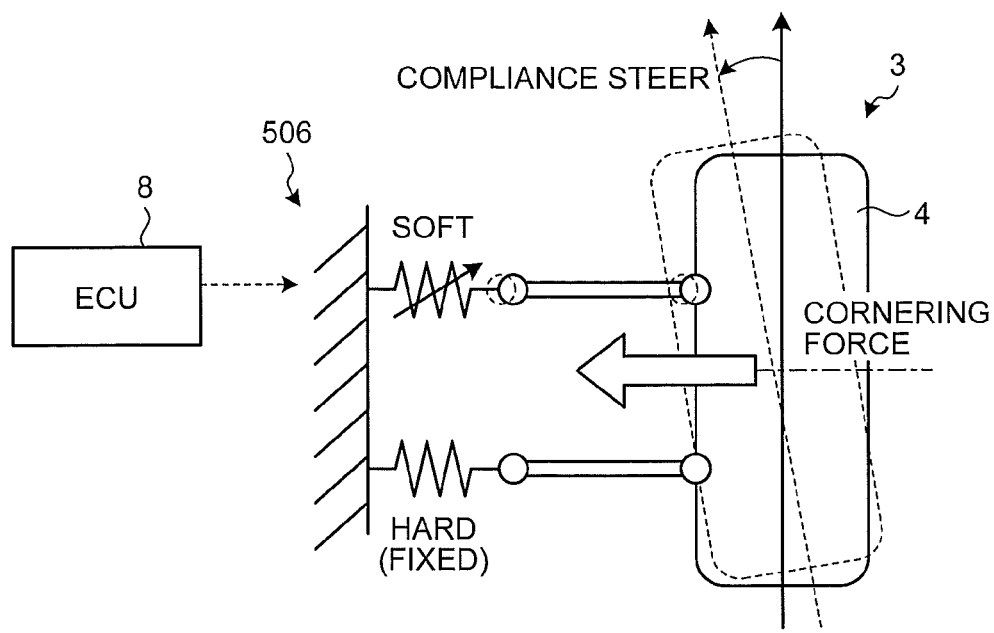
FIG. 17 is a schematic diagram illustrating a schematic configuration of an active bush device.
Figure 18:
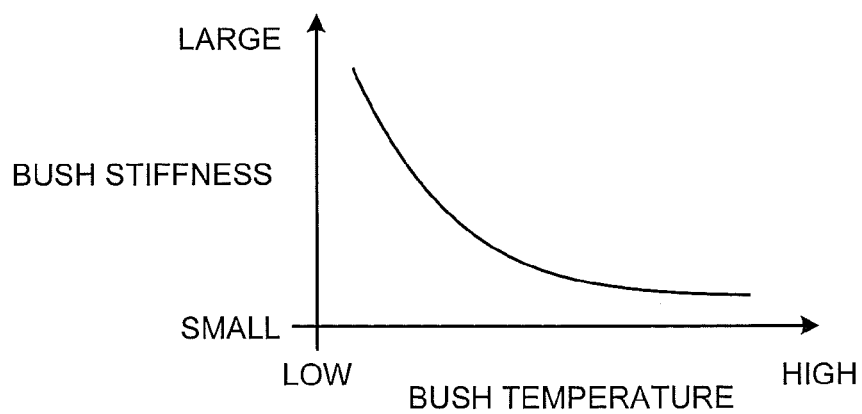
FIG. 18 is a diagram illustrating one example of a relationship between a bush temperature and bush stiffness.
Figure 19:
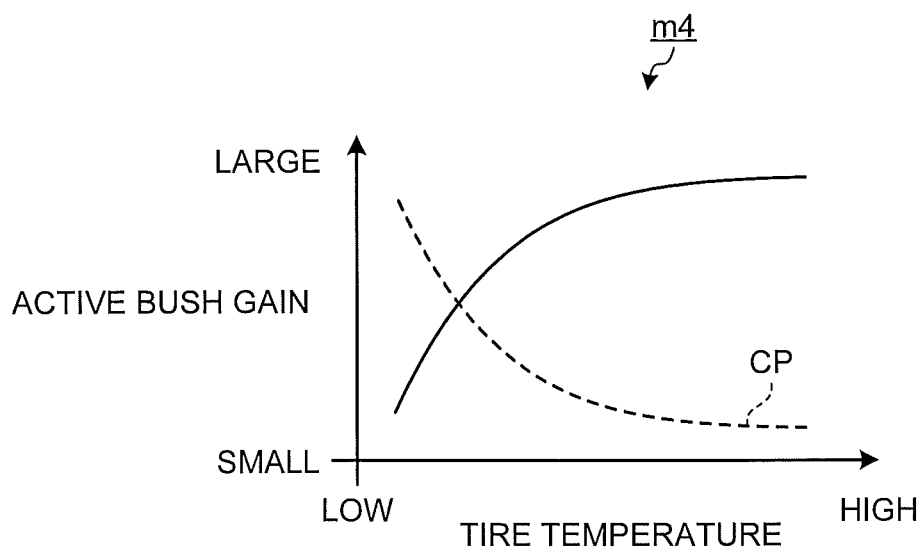
FIG. 19 is a diagram illustrating one example of an active bush gain map.
Figure 20:
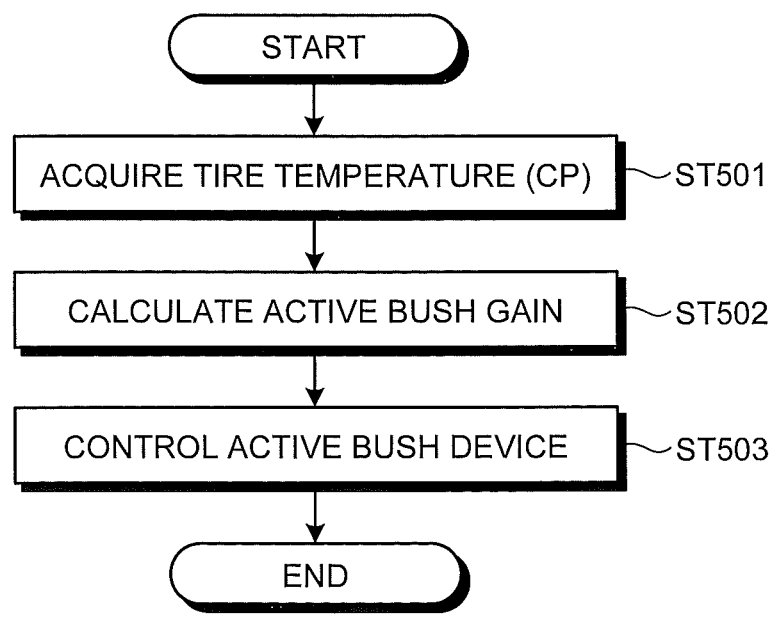
FIG. 20 is a flowchart illustrating one example of active bush control.

FIG. 16 is a schematic diagram illustrating a schematic configuration of a vehicle control system according to a fifth embodiment, FIG. 17 is a schematic diagram illustrating a schematic configuration of an active bush device, FIG. 18 is a diagram illustrating one example of a relationship between a bush temperature and a bush stiffness, FIG. 19 is a diagram illustrating one example of an active bush gain map, and FIG. 20 is a flowchart illustrating one example of active bush control. In the vehicle control system and the control device according to the fifth embodiment, the structure of the actuator is different from that in the fourth embodiment.

A vehicle control system 501 according to the present embodiment includes an active bush device 506 serving as an actuator as illustrated in FIG. 16. The ECU 8 controls the active bush device 506 according to the temperature of the tire 4, thereby compensating the deterioration in the tire characteristic involved with the increase in the tire temperature by the change in the vehicle characteristic. Thus, the ECU 8 suppresses the variation in the driving feeling. The vehicle control system 501 includes a rear-left wheel active bush device 506RL provided to the rear-left wheel 3RL, and a rear-right wheel active bush device 506RR provided to the rear-right wheel 3RR. When it is unnecessary to distinguish these devices, they are merely referred to as the active bush device 506.

As illustrated in FIG. 17, the active bush device 506 adjusts the stiffness of the bush of the suspension in the vehicle 2 so as to be capable of changing the slip angles of the rear-left wheel 3RL and the rear-right wheel 3RR of the vehicle 2. Thus, the compliance steer on the rear-left wheel 3RL and the rear-right wheel 3RR of the vehicle 2 can be adjusted. In this case, the compliance steer according to the stiffness of the bush and the cornering force is generated on the rear-left wheel 3RL and the rear-right wheel 3RR of the vehicle 2. The active bush device 506 is connected to the ECU 8, and controlled by the ECU 8. The active bush device 506 changes the bush temperature of one of the bushes through the heating wire, thereby changing the bush stiffness. As the bush temperature relatively increases, the bush stiffness relatively decreases, as illustrated in FIG. 18. The ECU 8 adjusts the bush temperature to adjust the bush stiffness by the active bush device 506, thereby adjusting the slip angles of the rear-left wheel 3RL and the rear-right wheel 3RR of the vehicle 2.

In other words, the active bush device 506 can adjust the behavior of the vehicle 2, and in the present embodiment, can change the degree of suppressing the behavior change of the vehicle 2. The active bush device 506 can change the suspension characteristic of the vehicle 2, thereby being capable of changing the degree of the behavior change of the vehicle 2, in other words, the degree of suppressing the behavior change of the vehicle 2. The active bush device 506 adjusts the bush temperature to adjust the bush stiffness, thereby being capable of changing the slip angles of the rear-left wheel 3RL and the rear-right wheel 3RR of the vehicle 2. Thus, the active bush device 506 can adjust the degree of suppressing the behavior change of the vehicle 2. In the present embodiment, as the electric energy supplied to the heating wire from the ECU 8 increases, and the bush temperature relatively increases, the bush stiffness relatively decreases, so that the slip angles of the rear-left wheel 3RL and the rear-right wheel 3RR of the vehicle 2 relatively increase. As a result, the active bush device 506 increases the compliance steer generated on the rear-left wheel 3RL and the rear-right wheel 3RR.

The ECU 8 in the present embodiment controls the active bush device 506 according to the temperature of the tire 4 detected by the temperature sensor 7, i.e., based upon the CP of the wheel 3 that is according to the temperature of the tire 4 detected by the temperature sensor 7 and that reduces with the increase in the temperature of the tire 4, thereby changing the degree of suppressing the behavior change of the vehicle 2.

When the temperature of the tire 4 detected by the temperature sensor 7 is relatively high, the ECU 8 increases the degree of suppressing the behavior change of the vehicle 2 by the active bush device 506, compared to the case where the temperature of the tire 4 is relatively low. Specifically, in this case, the ECU 8 controls the active bush device 506 to decrease the bush stiffness, compared to the case where the temperature of the tire 4 is relatively low, thereby increasing the slip angle of the rear wheel of the vehicle 2 to increase the compliance steer generated on the rear-left wheel 3RL and the rear-right wheel 3RR. Thus, the ECU 8 increases the degree of suppressing the behavior change of the vehicle 2 to the equivalent input.

The ECU 8 obtains an active bush gain based upon an active bush gain map m4 illustrated in FIG. 19, for example. In the active bush gain map m4, an abscissa axis indicates the temperature of the tire 4, and an ordinate axis indicates the active bush gain. The active bush device 506 increases the bush temperature of the vehicle 2, thereby decreasing the bush stiffness to increase the slip angle of the vehicle 2, as the active bush gain increases. On the other hand, the active bush device 506 decreases the bush temperature of the vehicle 2, thereby increasing the bush stiffness to decrease the slip angle of the vehicle 2, as the active bush gain decreases. The active bush gain map m4 indicates the relationship between the temperature of the tire 4 (in other words, the CP according to the tire temperature) and the active bush gain. The relationship between the temperature of the tire and the active bush gain is set in advance in the active bush gain map m4 in consideration of the temperature dependency of the tire characteristic, and with this state, the active bush gain map m4 is stored in a storage unit of the ECU 8. In the active bush gain map m4, the active bush gain increases with the increase in the tire temperature, i.e., with the decrease in the CP. The ECU 8 acquires the active bush gain from the temperature of the tire 4 detected by the temperature sensor 7 based upon the active bush gain map m4. The ECU 8 controls the active bush device 506 to adjust the slip angle of the rear wheel of the vehicle 2 based upon the acquired active bush gain, thereby adjusting the degree of suppressing the behavior change of the vehicle 2.

Specifically, as the temperature of the tire 4 relatively increases, the ECU 8 increases the slip angle of the rear wheel of the vehicle 2 by the active bush device 506, and as the temperature of the tire 4 relatively decreases, the ECU 8 decreases the slip angle of the rear wheel of the vehicle 2 by the active bush device 506. Thus, the ECU 8 increases the degree of suppressing the behavior change of the vehicle 2 by the active bush device 506, as the temperature of the tire 4 relatively increases, and decreases the degree of suppressing the behavior change of the vehicle 2 by the active bush device 506, as the temperature of the tire 4 relatively decreases.

As the temperature of the tire detected by the temperature sensor 7 becomes relatively high, for example, the ECU 8 increases the slip angle of the rear wheel by the active bush device 506, whereby the degree of suppressing the behavior change of the vehicle 2 by the active bush device 506 increases in the vehicle control system 501. Therefore, it can be prevented that the behavior change of the vehicle 2 increases, compared to the case where the tire temperature is low for the equivalent input. In other words, in the vehicle control system 501, the ECU 8 controls the bush stiffness by the active bush device 506 for adjusting the slip angle of the rear wheel. Thus, the compliance steer generated on the rear-left wheel 3RL and the rear-right wheel 3RR is adjusted, whereby the CP on the rear wheels is equivalently adjusted in order that the equivalent CP on the rear wheel of the vehicle 2 becomes constant with respect to the change in the temperature of the tire 4. Specifically, since the vehicle control system 501 controls the bush stiffness by the active bush device 506 for adjusting the slip angle of the rear wheel according to the change in the temperature of the tire 4, it can appropriately adjust the slip angle of the rear wheel according to the change in the CP to make the equivalent CP on the rear wheel of the vehicle 2 almost constant, even if the CP is changed due to the change in the temperature of the tire 4.

Thus, the vehicle control system 501 can make the equivalent CP on the rear wheel when the temperature of the tire 4 is relatively high and the equivalent CP on the rear wheel when the temperature of the tire 4 is relatively low almost equal to each other. Therefore, the vehicle control system 501 can perform the temperature compensation of the equivalent CP on the rear wheel to the temperature dependency of the tire characteristic in order to prevent the equivalent CP on the rear wheel from varying according to the temperature. The vehicle control system 501 can make the behavior change when the temperature of the tire is relatively high and the behavior change when the temperature of the tire is relatively low, i.e., the motions in the yaw direction, almost equal to each other to the equivalent operation input. Accordingly, the vehicle control system 501 can suppress the variation in the driving feeling involved with the change in the temperature of the tire 4, and hence, can suppress the sense of strangeness of the driver during the drive, for example.

One example of the active bush control in the vehicle control system 501 will next be described with reference to a flowchart in FIG. 20. Firstly, the ECU 8 acquires the temperature of the tire 4 detected by the temperature sensor 7 (ST501). The ECU 8 obtains an active bush gain based upon the active bush gain map m4 illustrated in FIG. 19, for example, based upon the temperature of the tire 4 acquired in ST501 (ST502). Then, the ECU 8 controls the active bush device 506 based upon the active bush gain determined in ST502 to adjust the bush stiffness by the active bush device 506 for adjusting the slip angle of the rear wheel. Thus, the compliance steer generated on the rear wheel is adjusted (ST503). Then, the ECU 8 ends the current control cycle, and moves to the next control cycle.

The active bush gain map m4 in FIG. 19 may describe the relationship between the CP according to the temperature of the tire 4 and the active bush gain. In this case, the ECU 8 acquires the temperature of the tire 4 in ST501, and then, estimates the current CP based upon the temperature of the tire. The ECU 8 may calculate the difference (deviation) between a reference CP that is a reference set in advance and the estimated CP, and may calculate the active bush gain by using this difference and the map (e.g., active bush gain∝reference CP−estimated CP).

The vehicle control system 501 according to the embodiment described above includes the active bush device 506 that can adjust the behavior of the vehicle 2, the temperature sensor 7 that detects the temperature of the tire 4 on the wheel 3 of the vehicle 2, and the ECU 8 that controls the active bush device 506 according to the temperature of the tire 4 detected by the temperature sensor 7 so as to change the degree of suppressing the behavior change of the vehicle 2 by the active bush device 506. Accordingly, the vehicle control system 501 and the ECU 8 can suppress the variation in the driving feeling.

The active bush device 506 described above is not limited to the one having the configuration described above. For example, a fluid-pressure active bush device may be employed, wherein a liquid chamber (fluid chamber) is provided in the bush of the suspension, and a pressure of a fluid supplied to the liquid chamber is controlled to change an elastic coefficient (bush stiffness), whereby a slip angle of the wheel 3 can be changed.

Sixth Embodiment

Figure 21:
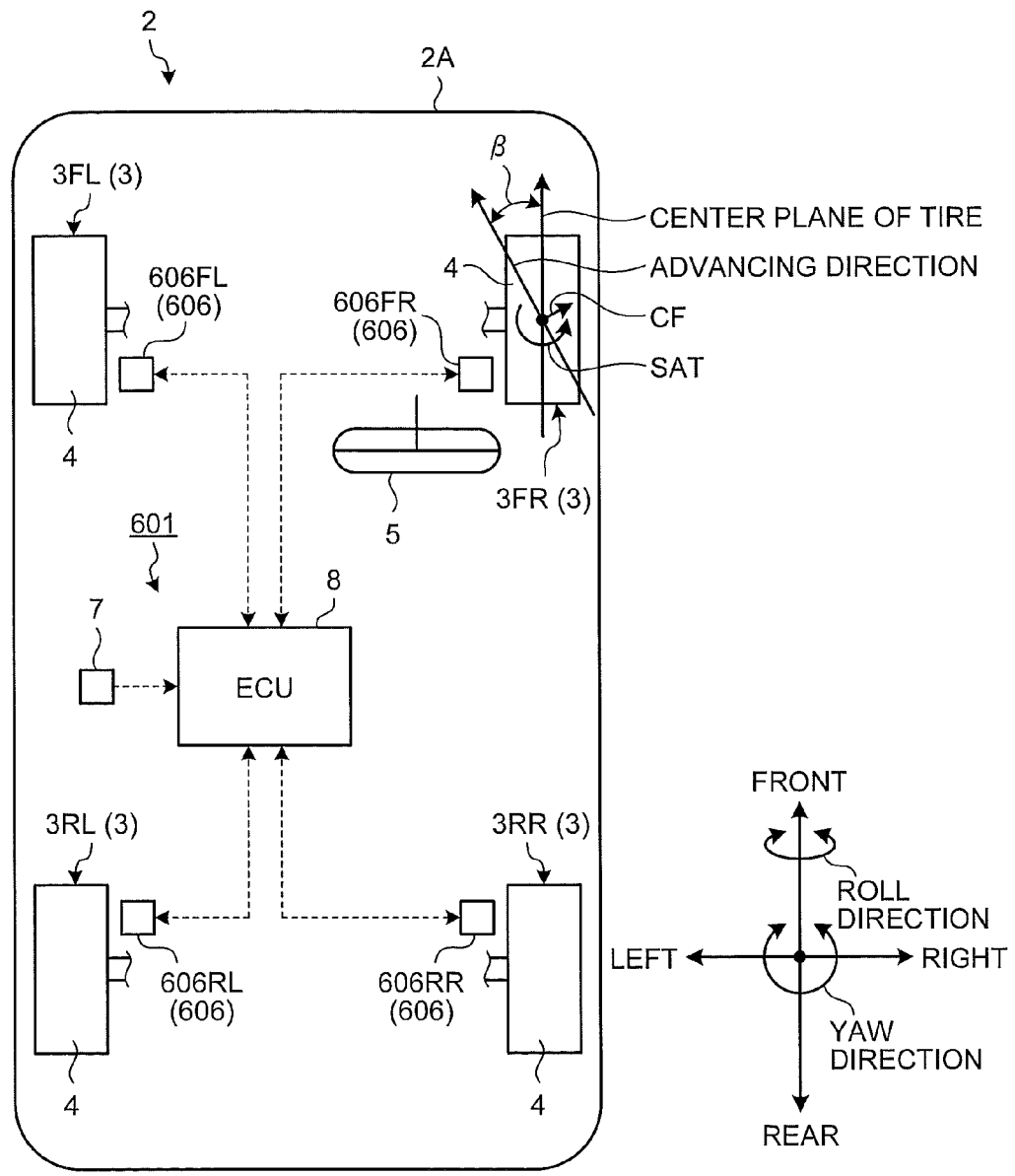
FIG. 21 is a schematic diagram illustrating a schematic configuration of a vehicle control system according to a sixth embodiment.
Figure 22:
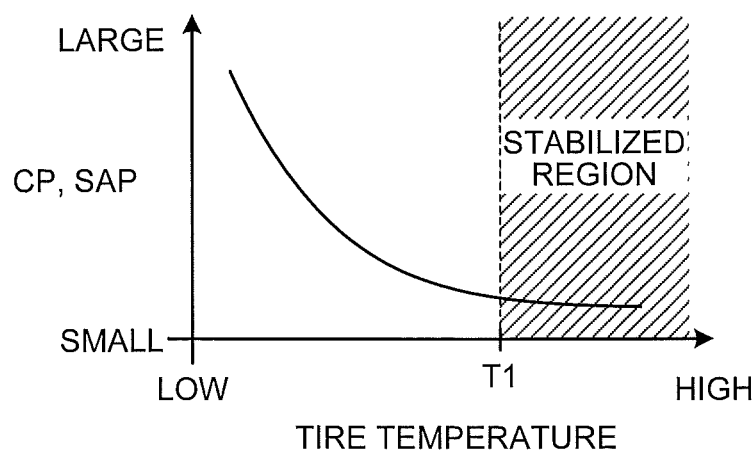
FIG. 22 is a diagram explaining a stabilized region of a tire characteristic.

FIG. 21 is a schematic diagram illustrating a schematic configuration of a vehicle control system according to a sixth embodiment, and FIG. 22 is a diagram explaining a stabilized region of a tire characteristic. In the vehicle control system and the control device according to the sixth embodiment, the structure of the actuator which includes an adjusting device is different from that in the first to fifth embodiments.

A vehicle control system 601 according to the present embodiment includes an adjusting device 606 as illustrated in FIG. 21. Since the ECU 8 serving as the control device controls the adjusting device 606 according to the temperature of the tire 4, the vehicle control system 601 keeps the tire temperature appropriate, thereby effectively suppressing the variation in the driving feeling.

The vehicle control system 601 includes a front-left wheel adjusting device 606FL provided to the front-left wheel 3FL, a front-right wheel adjusting device 606FR provided to the front-right wheel 3FR, a rear-left wheel adjusting device 606RL provided to the rear-left wheel 3RL, and a rear-right wheel adjusting device 606RR provided to the rear-right wheel 3RR. When it is unnecessary to distinguish these devices, they are merely referred to as the adjusting device 606.

The adjusting device 606 can adjust the temperature of the tire 4. The adjusting device 606 ejects air from an air conditioner or exhaust gas to a tire house of the tire 4 to adjust the tire temperature, for example. Typically, the adjusting device 606 blows the air or exhaust gas to the tire 4 to increase the tire temperature, or keep the tire temperature to a temperature equal to or higher than a predetermined temperature. The adjusting device 606 is connected to the ECU 8, and controlled by the ECU 8.

As described above, when the temperature of the tire is high, the CP or SAP of the tire 4 tends to be low. As illustrated in FIG. 22, the temperature dependency reduces, as the temperature of the tire becomes a temperature equal to or higher than a predetermined temperature. Here, the tire 4 is in a stabilized region where the CP or the SAP becomes stable in a region where the tire temperature is equal to or higher than a boundary temperature T1. Specifically, the amount of change of the CP or SAP to the change in the tire temperature becomes relatively low.

In the vehicle control system 601 according to the present embodiment, the ECU 8 controls the adjusting device 606 in order to adjust the temperature of the tire 4 to a temperature equal to or higher than the boundary temperature T1 (e.g., about 40° C.) that is the predetermined temperature set in advance. The ECU 8 controls the respective adjusting devices 606 based upon the temperature of the tire 4 on each wheel 3 detected by the temperature sensor 7, in order to keep the temperature of the tire 4 to a temperature equal to or higher than the boundary temperature T1 as much as possible. For example, the ECU 8 controls the adjusting device 606 to accelerate the warm-up of the tire 4 in order to promptly increase the tire temperature to the temperature equal to or higher than the boundary temperature T1. Accordingly, the ECU 8 shortens the cooling period in which the temperature of the tire 4 is less than the boundary temperature T1 as much as possible, and then, keeps the temperature of the tire 4 at the temperature equal to or higher than the boundary temperature T1.

Since the adjusting device 606 keeps the temperature of the tire 4 at the temperature equal to or higher than the boundary temperature T1 by which the temperature dependency of the CP or SAP reduces, the vehicle control system 601 can keep the appropriate tire temperature, thereby being capable of suppressing the change in the tire characteristic including the CP and SAP. As a result, the vehicle control system 601 can stabilize the tire characteristic including the CP and SAP, so that it can suppress the variation in the behavior change of the vehicle 2, and suppress the variation in the driving feeling.

For example, the vehicle control system 601 controls the above-mentioned various actuators according to the temperature of the tire 4 so as to change the degree of suppressing the behavior change of the vehicle 2 by the actuators, until the temperature of the tire 4 reaches the boundary temperature T1. Therefore, the vehicle control system 601 can suppress the variation in the behavior change of the vehicle 2. After the temperature of the tire 4 becomes equal to or higher than the boundary temperature T1, the adjusting device 606 keeps the temperature of the tire 4 at the temperature equal to or higher than the boundary temperature T1, so that the vehicle control system 601 can suppress the change in the tire characteristic. Consequently, the vehicle control system 601 can effectively suppress the variation in the driving feeling more appropriately.

The vehicle control system 601 according to the embodiment described above includes the adjusting device 606 that can adjust the temperature of the tire 4 on the wheel 3 of the vehicle 2, and the ECU 8 that controls the adjusting device 606 for adjusting the temperature of the tire 4 to the temperature equal to or higher than the boundary temperature T1 set in advance. Accordingly, the vehicle control system 601 and the ECU 8 can suppress the variation in the driving feeling. The vehicle control system 601 may not include the above-mentioned various actuators, if it includes the adjusting device 606.

The vehicle control systems and the control devices according to the above-mentioned embodiments of the present invention are not limited to those in the above-mentioned embodiments, and various modifications are possible within a scope described in the claims. The vehicle control system and the control device according to the embodiments of the present invention may be configured by combining plural embodiments described above.

In the above description, the control device in the vehicle control system is described as the ECU controlling the respective units of the vehicle. However, the invention is not limited thereto. For example, the control device may be provided separate from the ECU, and may be configured to receive and transmit information such as detection signals, drive signals, or control commands, from and to the ECU.

The degree of suppressing the behavior change of the vehicle 2 described above corresponds to the amount of suppressing the behavior change of the vehicle 2. Specifically, the control device increases the amount of suppressing the behavior change of the vehicle by the actuator, as the temperature of the tire detected by a temperature detecting device is high, and decreases the amount of suppressing the behavior change of the vehicle by the actuator, as the temperature of the tire detected by the temperature detecting device is low.

INDUSTRIAL APPLICABILITY

As described above, the vehicle control system and the control device according to the present invention is well adaptable to a vehicle control system and a control device mounted to various vehicles.

REFERENCE SIGNS LIST 1, 201, 301, 401, 501, 601 VEHICLE CONTROL SYSTEM
2 VEHICLE
3 WHEEL
4 TIRE
5 STEERING WHEEL
6 EPS DEVICE (ACTUATOR)
7 TEMPERATURE SENSOR (TEMPERATURE DETECTING DEVICE)
8 ECU (CONTROL DEVICE)
206 VGRS DEVICE (ACTUATOR)
306 ARS DEVICE (ACTUATOR)
506 ACTIVE BUSH DEVICE (ACTUATOR)
606 ADJUSTING DEVICE
m1 EPS GAIN MAP
m2 CP/W MAP
m3 ARS GAIN MAP
m4 ACTIVE BUSH GAIN MAP

The invention claimed is:

1. A vehicle control system comprising:
an actuator capable of adjusting a behavior of a vehicle;
a temperature detecting device configured to detect a temperature in a tread of a tire on a wheel of the vehicle; and
a control device configured to control the actuator according to the temperature in a tread of the tire detected by the temperature detecting device so as to increase a degree of suppressing a behavior change of the vehicle by the actuator, when the temperature in the tread of the tire detected by the temperature detecting device is relatively high, compared to a case where the temperature in the tread of the tire is relatively low.

2. The vehicle control system according to claim 1, wherein
the control device decreases the degree of suppressing the behavior change of the vehicle by the actuator, when the temperature in the tread of the tire detected by the temperature detecting device is relatively low, compared to a case where the temperature in the tread of the tire is relatively high.

3. The vehicle control system according to claim 2, wherein
the control device increases the degree of suppressing the behavior change of the vehicle by the actuator, as the temperature in the tread of the tire detected by the temperature detecting device is high, and decreases the degree of suppressing the behavior change of the vehicle by the actuator, as the temperature in the tread of the tire detected by the temperature detecting device is low.

4. The vehicle control system according to claim 2, wherein
the actuator can change the degree of suppressing the behavior change of the vehicle by changing a steering characteristic of the vehicle.

5. The vehicle control system according to claim 2, wherein
the actuator can change the degree of suppressing the behavior change of the vehicle by changing a suspension characteristic of the vehicle.

6. The vehicle control system according to claim 2, wherein
the actuator can steer the wheel according to a steering torque inputted to a steering member, and
the control device controls the actuator so as to decrease a turning amount of the wheel to the steering torque inputted to the steering member, when the temperature in the tread of the tire detected by the temperature detecting device is relatively high, compared to the case in which the temperature in the tread of the tire is relatively low.

7. The vehicle control system according to claim 1, wherein
the control device increases the degree of suppressing the behavior change of the vehicle by the actuator, as the temperature in the tread of the tire detected by the temperature detecting device is high, and decreases the degree of suppressing the behavior change of the vehicle by the actuator, as the temperature in the tread of the tire detected by the temperature detecting device is low.

8. The vehicle control system according to claim 7, wherein
the actuator can change the degree of suppressing the behavior change of the vehicle by changing a steering characteristic of the vehicle.

9. The vehicle control system according to claim 7, wherein
the actuator can change the degree of suppressing the behavior change of the vehicle by changing a suspension characteristic of the vehicle.

10. The vehicle control system according to claim 7, wherein
the actuator can steer the wheel according to a steering torque inputted to a steering member, and
the control device controls the actuator so as to decrease a turning amount of the wheel to the steering torque inputted to the steering member, when the temperature in the tread of the tire detected by the temperature detecting device is relatively high, compared to the case in which the temperature in the tread of the tire is relatively low.

11. The vehicle control system according to claim 1, wherein
the actuator can change the degree of suppressing the behavior change of the vehicle by changing a steering characteristic of the vehicle.

12. The vehicle control system according to claim 11, wherein
the actuator can change the degree of suppressing the behavior change of the vehicle by changing a suspension characteristic of the vehicle.

13. The vehicle control system according to claim 11, wherein
the actuator can steer the wheel according to a steering torque inputted to a steering member, and
the control device controls the actuator so as to decrease a turning amount of the wheel to the steering torque inputted to the steering member, when the temperature in the tread of the tire detected by the temperature detecting device is relatively high, compared to the case in which the temperature in the tread of the tire is relatively low.

14. The vehicle control system according to claim 1, wherein
the actuator can change the degree of suppressing the behavior change of the vehicle by changing a suspension characteristic of the vehicle.

15. The vehicle control system according to claim 1, wherein
the actuator can steer the wheel according to a steering torque inputted to a steering member, and
the control device controls the actuator so as to decrease a turning amount of the wheel to the steering torque inputted to the steering member, when the temperature in the tread of the tire detected by the temperature detecting device is relatively high, compared to the case in which the temperature in the tread of the tire is relatively low.

16. The vehicle control system according to claim 1, wherein
the actuator can change a slip angle balance between a slip angle of a front wheel and a slip angle of a rear wheel of the vehicle, and
the control device controls the actuator so as to adjust the slip angle balance, and increases the degree of suppressing the behavior change of the vehicle by the actuator, when the temperature in the tread of the tire detected by the temperature detecting device is relatively high, compared to the case in which the temperature in the tread of the tire is relatively low.

17. The vehicle control system according to claim 1, wherein
the actuator can change the slip angle of the rear wheel of the vehicle, and
the control device controls the actuator so as to increase the slip angle of the rear wheel of the vehicle, when the temperature in the tread of the tire detected by the temperature detecting device is relatively high, compared to the case in which the temperature in the tread of the tire is relatively low.

18. The vehicle control system according to claim 1, wherein
the control device controls the actuator so as to change the degree of suppressing the behavior change of the vehicle based on cornering power or self-aligning power of the wheel that reduces with the increase in the temperature in the tread of the tire.

19. The vehicle control system according to claim 1, further comprising:
an adjusting device capable of adjusting the temperature in the tread of the tire, wherein
the control device controls the adjusting device so as to adjust the temperature in the tread of the tire to be a temperature equal to or higher than a predetermined temperature set in advance.

20. A control device that controls an actuator, which can adjust a behavior of a vehicle, according to a temperature in the tread of a tire detected by a temperature detecting device that detects the temperature in the tread of the tire on a wheel of the vehicle, in order to increase a degree of suppressing a behavior change of the vehicle by the actuator, when the temperature in the tread of the tire detected by the temperature detecting device is relatively high, compared to a case where the temperature in the tread of the tire is relatively low.

* * * * *